US008096866B2

(12) United States Patent
Kamano

(10) Patent No.: US 8,096,866 B2
(45) Date of Patent: Jan. 17, 2012

(54) GAMING MACHINE AND METHOD FOR GAMING MACHINE

(75) Inventor: Kenichi Kamano, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 837 days.

(21) Appl. No.: 11/784,262

(22) Filed: Apr. 6, 2007

(65) Prior Publication Data

US 2008/0248855 A1 Oct. 9, 2008

(51) Int. Cl.
*A63F 13/00* (2006.01)

(52) U.S. Cl. ........................................... 463/16; 463/20

(58) Field of Classification Search ............... 463/16–20
See application file for complete search history.

(56) References Cited

U.S. PATENT DOCUMENTS 5,848,932 A 12/1998 Adams
6,855,052 B2 * 2/2005 Weiss et al. .................... 463/16
7,144,321 B2 12/2006 Mayeroff
2006/0121971 A1 * 6/2006 Slomiany et al. ............... 463/16
2006/0148553 A1 * 7/2006 Dodge ........................... 463/20
2006/0160620 A1 * 7/2006 Matthews et al. ............... 463/42
2007/0111776 A1 * 5/2007 Griswold et al. ............... 463/16
2007/0180978 A1 * 8/2007 Ozaki et al. .................... 84/602
2007/0243925 A1 * 10/2007 LeMay et al. .................. 463/20
2007/0243934 A1 * 10/2007 Little et al. ..................... 463/40

* cited by examiner

*Primary Examiner* — Masud Ahmed
(74) *Attorney, Agent, or Firm* — Masuvalley & Partners

(57) ABSTRACT

The present invention provides a gaming machine that includes a slot machine, a bonus device and a device controller. The device controller remotely operates the bonus device and the bonus device provides a bonus award independently from the slot machine. The bonus device describes a bonus display information upon receiving from the device controller with a condition independent from a game result of the slot machine. Also, the device controller can collect a wager from one or more slot machines, determine a bonus content based on the collected wager, remotely operate one or more bonus devices, and transmit same or different bonus display information for each bonus device.

9 Claims, 26 Drawing Sheets

GAMING MACHINE AND METHOD FOR GAMING MACHINE

TECHNICAL FIELD

This document provides detailed descriptions of a gaming machine that provides methods for presenting a bonus award with a remotely controlled mechanical device, such as wheel devices, and methods for a distributed bonus award.

BACKGROUND OF INVENTION

A majority of the games provided at a casino are computer based. For example, video slot machines, mechanical slot machines, video poker machines and so on are controlled by computer software. Nowadays, most of the casino games offer a bonus game or other features which are sometimes called fever mode, with computerized graphics and/or animations. Some of the casino games provide bonus games or features by moving mechanical movable devices such as wheel devices or mechanical gauges to indicate bonus awards to be awarded to players.

Such mechanical movable devices are basically designed to work only for designed slot machines. In other words, any other games that are not designed to be able to handle such devices cannot use the device for the games themselves.

The mechanical movable devices are also designed only to present a pre-fixed bonus award for a specific game and a specific slot machine. In other words, the contents of the devices cannot be dynamically changeable in bonus games or rounds. For example, a mechanical movable device is able to indicate a bonus award of “1000” credits. It can only indicate “1000” unless a game that uses the device is previously designed and programmed. Some games may move the devices twice to indicate a value of “2000”. But this is statically determined when a game is developed or installed.

The gaming machine described herein is aimed to address one or more of the problems set forth above.

BRIEF SUMMARY OF THE INVENTION

In order to achieve the above objectives, a first invention provides a gaming machine that has a slot machine having a device for displaying a game result, a bonus device provided independently from the slot machine, and a device controller for remotely operating the bonus device. The bonus device describes a bonus display information upon receiving from the device controller in a condition independent from a game result of the slot machine.

Further, the device controller may collect a wager from one or more slot machines, determine a bonus content based on the collected wager, remotely operate one or more bonus devices, and transmit a same or different bonus display information for each bonus device.

Also, the device controller may have an external controller which determines bonus content based on the wager and transmits the bonus content to the device controller. The external device controller may transmit a collected wager to the external controller, and transfer a bonus content determination to the external controller.

Further, the device controller may use a casino management system as an external controller, and transfer the bonus content determination to the casino management system.

The bonus device may have a device control unit for exchanging information with the device controller and a display portion for displaying bonus content.

In addition, the display portion may have one or more liquid crystal display devices, and/or one or more movable devices.

The device controller may remotely operate a plurality of bonus devices, and transmit same or different bonus display information for each of the bonus devices.

In addition, the plurality of bonus devices are grouped into a plurality of bonus display groups (group 1, 2, . . . N), each of the bonus display groups having one or more bonus display devices, and the device controller shows one bonus content using the plurality of the bonus display groups.

Further, the plurality of bonus display groups may be divided into an upper level group and a lower level group having one or more bonus display groups, and the bonus device of the upper level group shows a bonus display of a selected bonus device of the lower level group.

The plurality of bonus devices may be shared by a plurality of slot machines, and show bonus content to the slot machines.

In addition, the shared plurality of bonus devices show bonus content for any of the plurality of slot machines installed on floor. Further, the plurality of slot machines may have individual bonus devices.

The device controller simultaneously displays bonus display contents of a plurality of slot machines using the bonus devices shared by the plurality of slot machines.

In order to achieve the above objectives, a second invention provides a gaming machine that has a slot machine having a device for displaying a game result, and an user interface unit for exchanging player interaction messages. The second invention further has a bonus device provided independently from the slot machine, and a device controller for remotely operating the bonus device. The device controller sends a player interaction message to the user interface unit of the slot machine, and transmits bonus display information to the bonus device when receiving an input of a player from the user interface unit. And the user interface unit of the slot machine receives the player interaction messages from the device controller and transmits the player interaction message to the slot machine for displaying the player interaction message, and transmits a player input received from an input portion provided to the slot machine when receiving input from a player. Finally, the bonus device displays a bonus content when receiving the bonus display information from the device controller.

The second invention further has a user interface unit which may show a display prompting a player to input onto the slot machine.

In addition, the player input is recognized by touching the display, or pressing a button of a slot machine.

Further, the second invention has a touch sensitive display allowing a flick of a finger on a display, detecting moving direction and moving speed of the finger, and reflecting those information on a display of the bonus device.

In order to achieve the above objectives, a third invention provides a method for a gaming device provided independently from the slot machine, and a device controller remotely operating the gaming device. The method having steps of making bonus content with a condition independent from the slot machine, the device controller transmitting information of the bonus content to the slot machine, the slot machine requesting a player for input with the information, an input portion provided to the slot machine receiving an input of a player, and starting a movable device provided to the gaming device with the slot machine returning an input of a player.

DETAILED DESCRIPTION OF THE INVENTION

Figure 1:
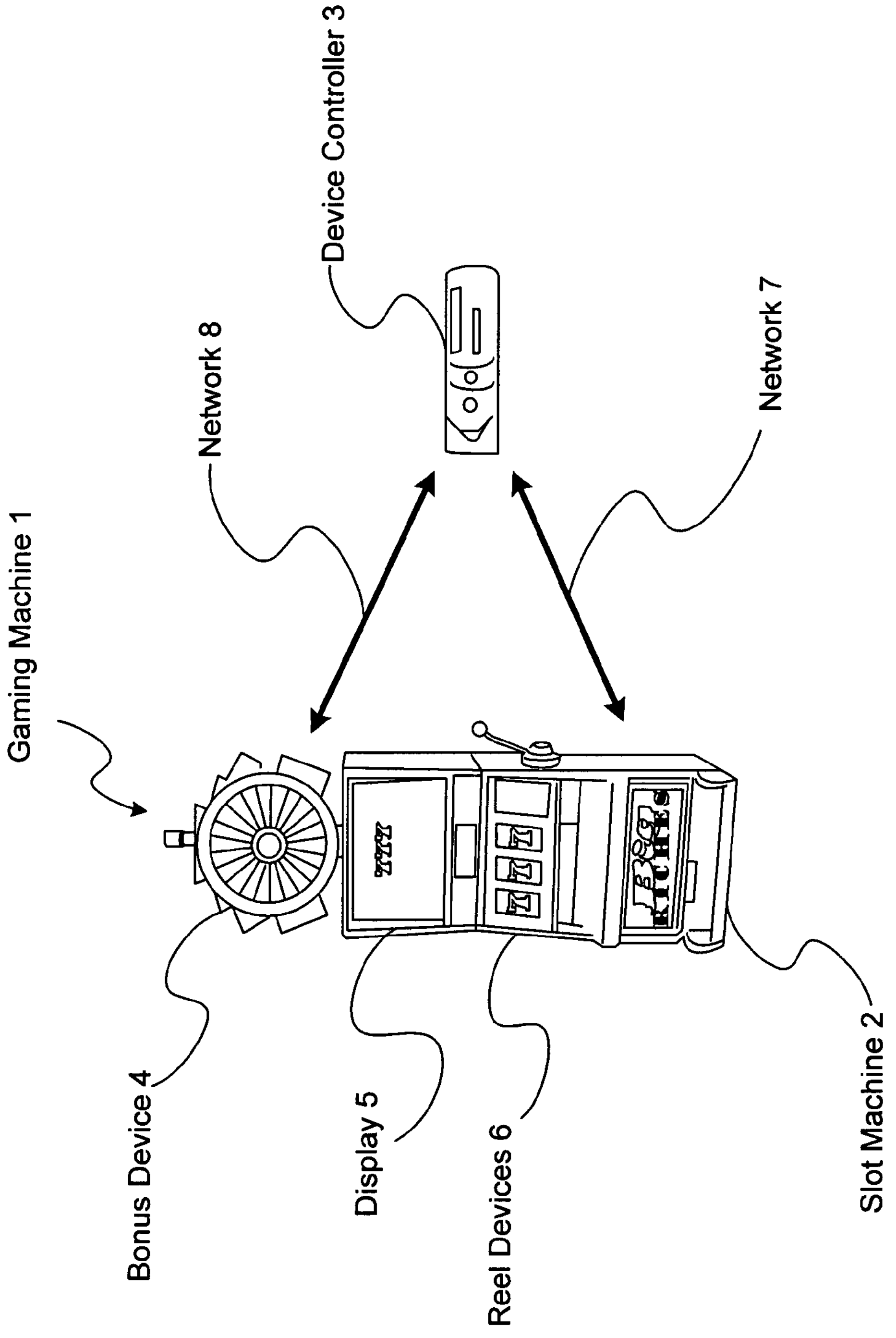
FIG. 1 is a perspective view explaining the gaming machine 1 according to embodiment 1 of the present invention.

FIG. 1 shows the gaming machine 1 according to embodiment 1 of the present invention. The gaming machine 1 has a Slot Machine 2, a Device Controller 3 and a Bonus Device 4. The Slot Machine 2 is what computerized casino games are running on. The Slot Machine 2 can be video slot machines, mechanical slot machines, video poker machines, and any other casino machines. The Device Controller 3 is placed independently from the slot machine 2. The Bonus Device 4 is a presentation device which the Device Controller 3 communicates with and exchanges messages of present bonus awards which a player will be awarded.

The Slot Machine 2 is connected to the Device Controller 3 with a wired/wireless network 7. The Device Controller 3 collects wager information of every game from the Slot Machine 2 via the network 7. A player plays a game on the Slot Machine 2. Game outcome of the game play is displayed on the Slot Machine 2 by using display 5 and/or physical reel device 6. The wager information (e.g. total credits bet to this game play) is sent over the network 7 from the Slot Machine 2 to the Device Controller 3.

Figure 2:
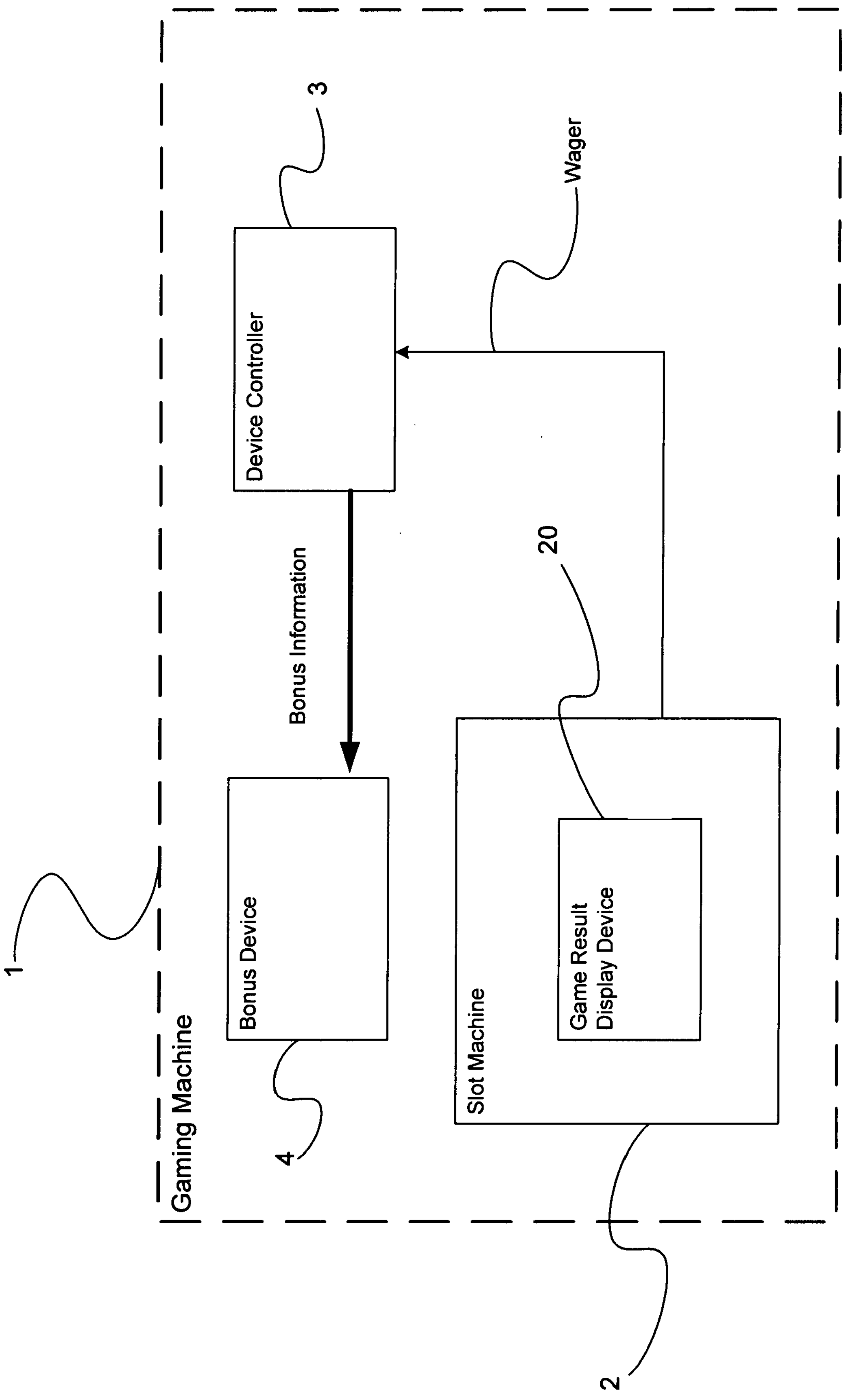
FIG. 2 is a block diagram explaining the gaming machine 1 according to embodiment 1 of the present invention.

FIG. 2 is a block diagram explaining the gaming machine 1 according to embodiment 1 of the present invention. The Device Controller 3 collects the wager information and determines whether a condition of a bonus award is satisfied. One embodiment of the condition of a bonus award is that accumulated wagers have reached a randomly pre-determined value (e.g. total wager reached $10,000.00). When a condition of a bonus award is satisfied, the Device Controller 3 determines a bonus award to the player whose wager information satisfied a bonus award. One embodiment of the determination of a bonus award is that the Device Controller 3 awards 10% of the pre-determined value (e.g. $1,000.00 in the case of the example above).

The Device Controller 3 generates messages to present the bonus awards to the player by using the Bonus Device 4. The messages include, but are not limited to, a bonus device ID, a value for the bonus award, steps to present the bonus award. The Device Controller 3 sends the messages to the Bonus Device 4.

The Bonus Device 4 is also connected to the Device Controller 3 with a wired/wireless network 8. The Slot Machine 2, the Device Controller 3 and the Bonus Device 4 may be placed in the same network. The Bonus Device 4 receives the messages from the Device Controller 3 via the network 8. The Bonus Device 4 presents the bonus awards according to the steps described in the messages. One embodiment of the presentation is that the Bonus Device 4 rotates and stops a mechanical movable wheel device at the designed position to show the value for the bonus award. Once the bonus award has been presented to the player, the Bonus Device 4 sends a message back to the Device Controller 3 to notify that the bonus presentation has completed.

When the Device Controller 3 receives the message back indicating that the bonus presentation has completed, the Device Controller 3 sends a message to award the bonus to the Slot Machine 2 whose player won the bonus awards. The Slot Machine 2 receives the message, awards the bonus and displays via a Game Result Display Device 20. When the bonus is awarded to the player, the Slot Machine 2 sends a message back to the Device Controller 3. Upon receiving the message by the Device Controller 3, a bonus award cycle completes and a new bonus award cycle starts.

In this embodiment 1 of the present invention, the bonus device 4 describes a bonus display information upon receiving from the device controller 3 in a condition independent from a game result of the slot machine 2. In this way, the players experience a heightened feeling of anticipation and excitement. Game Result Display Devices 20*a* and 20*b* have a function to display the bonus award.

Figure 3:
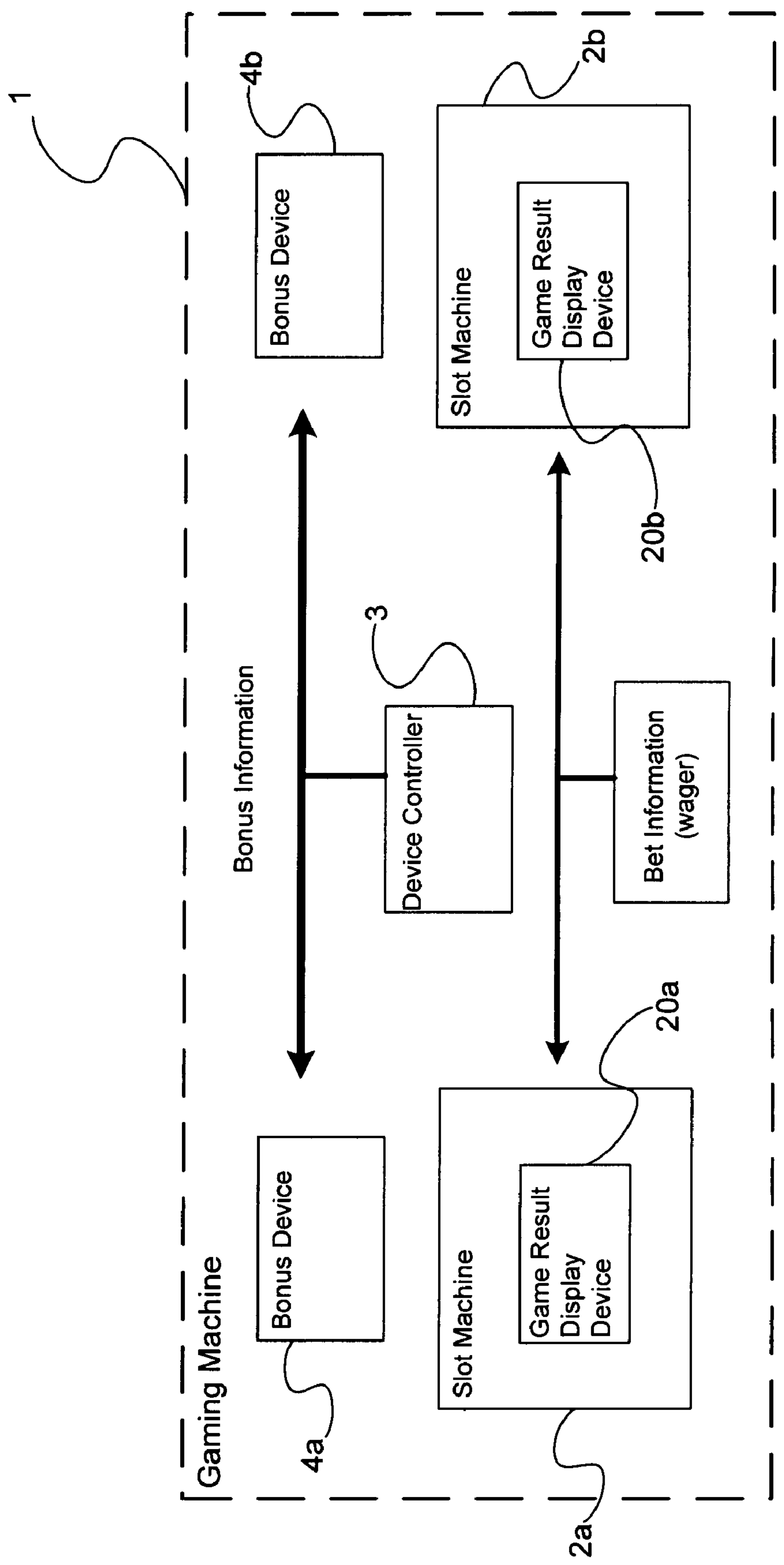
FIG. 3 is a block diagram explaining the gaming machine 1 according to embodiment 2 of the present invention.

FIG. 3 shows a block diagram explaining the gaming machine 1 according to embodiment 2 of the present invention. Typically in traditional bonus awards systems and gaming machines, only one player would be awarded a bonus when triggered. For example, a bonus determination program like the Device Controller 3 determines a winner of a bonus. It would determine a bonus winner whose wagers make a condition of a bonus award satisfied. For example, accumulated wagers reach $10,000.00 by accumulating wagers recently received from a player and the player is assumed winner of the bonus.

The player would be awarded full amount of the bonus. In the gaming machine described herein, the Device Controller 3 will decide that one or more active players would be equal or weighted rate bonus awards according to a decision rule. In this embodiment 2, the gaming machine 1 has at least two Slot Machines 2*a* and 2*b*. Also, at least two Bonus Devices 4*a* and 4*b*.

In this embodiment 2, multiple players are playing at the time when a bonus condition is satisfied. The Device Controller 3 picks up at least one player for the bonus award. Then, the Device Controller 3 determines a bonus amount for each player picked up. Once winners and bonus amounts are determined, the Device Controller 3 awards the bonus in the same manner described above.

One embodiment of determining active players is that the Device Controller 3 keeps track of all wager information received. When a bonus condition is satisfied, the Device Controller 3 checks whether each Slot Machine is currently playing (a player exists at the Slot Machine 2*a*) and what are the total wagers in a specific time (e.g. total wagers in the most recent five minutes).

If total wagers exceed a threshold for a bonus award, the Slot Machine 2*a* is eligible for a bonus award. If both conditions are satisfied, a player at the Slot Machine 2*a* is assumed to be an active player. The Device Controller 3 may equally divide a bonus amount into all active players or may divide a bonus with weighted rates in "the more wagers the more awards" basis.

Figure 4:
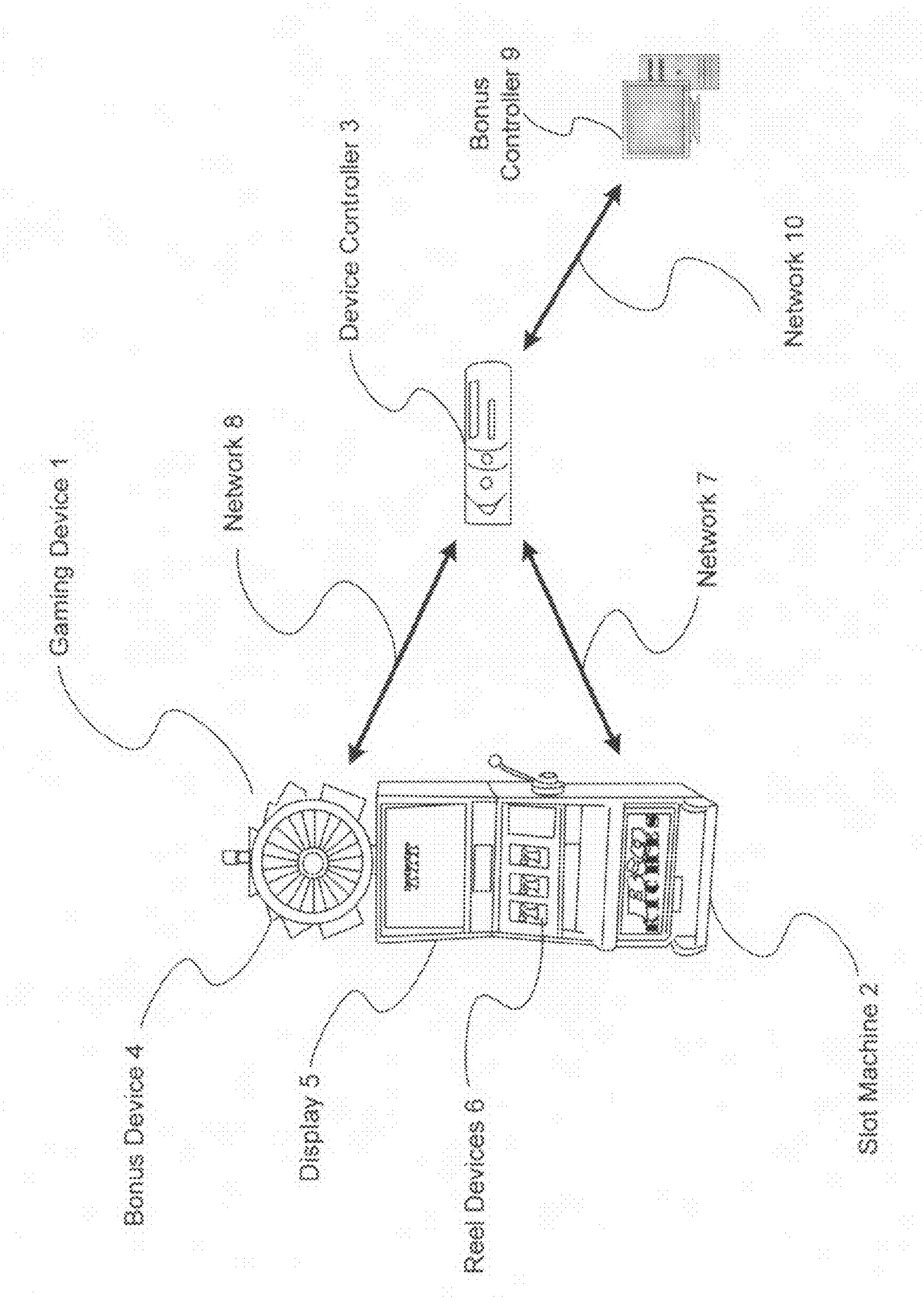
FIG. 4 is a perspective view explaining the gaming machine 1 according to embodiment 3 of the present invention.

FIG. 4 is a perspective view explaining the gaming machine 1 according to embodiment 3 of the present invention. In this embodiment 3, the main tasks of the Device Controller 3 are: 1) determining a bonus winner and amount, and 2) presentation of bonus awards and awarding bonus to players. These tasks will be executed after a bonus condition is satisfied. It is not important for the Device Controller 3 to determine how a bonus condition is satisfied or how its amount is decided. In other words, the embodiment 3 described above can execute bonus awards in the manner described above just by being notified that a bonus condition is satisfied and by being provided its amount.

The embodiment 3 has an External Bonus Controller 9 which determines a bonus award for the Device Controller 3 via a Network 10. The External Bonus Controller 9 can be an existing jackpot controller which supports mystery or random jackpot features. Typically, such jackpot controllers are connected directly to and communicate directly with the Slot Machine 2 for collecting wagers and awarding bonuses.

In this embodiment 3, such jackpot controllers directly handle all jackpot tasks including determining winners and awarding bonuses so that it will be impossible to realize the methods and gaming machines described in the embodiment 2, unless otherwise such jackpot controllers are designed for the purpose.

However, there are a lot of ways and methods to determine bonus winner and bonus amount. For example, the External Bonus Controller 9, as a mystery jackpot controller, has a minimum and maximum value of a jackpot value. A jackpot value starts at a minimum value and will be increased by wagers of the Slot Machine 2.

Figure 5:
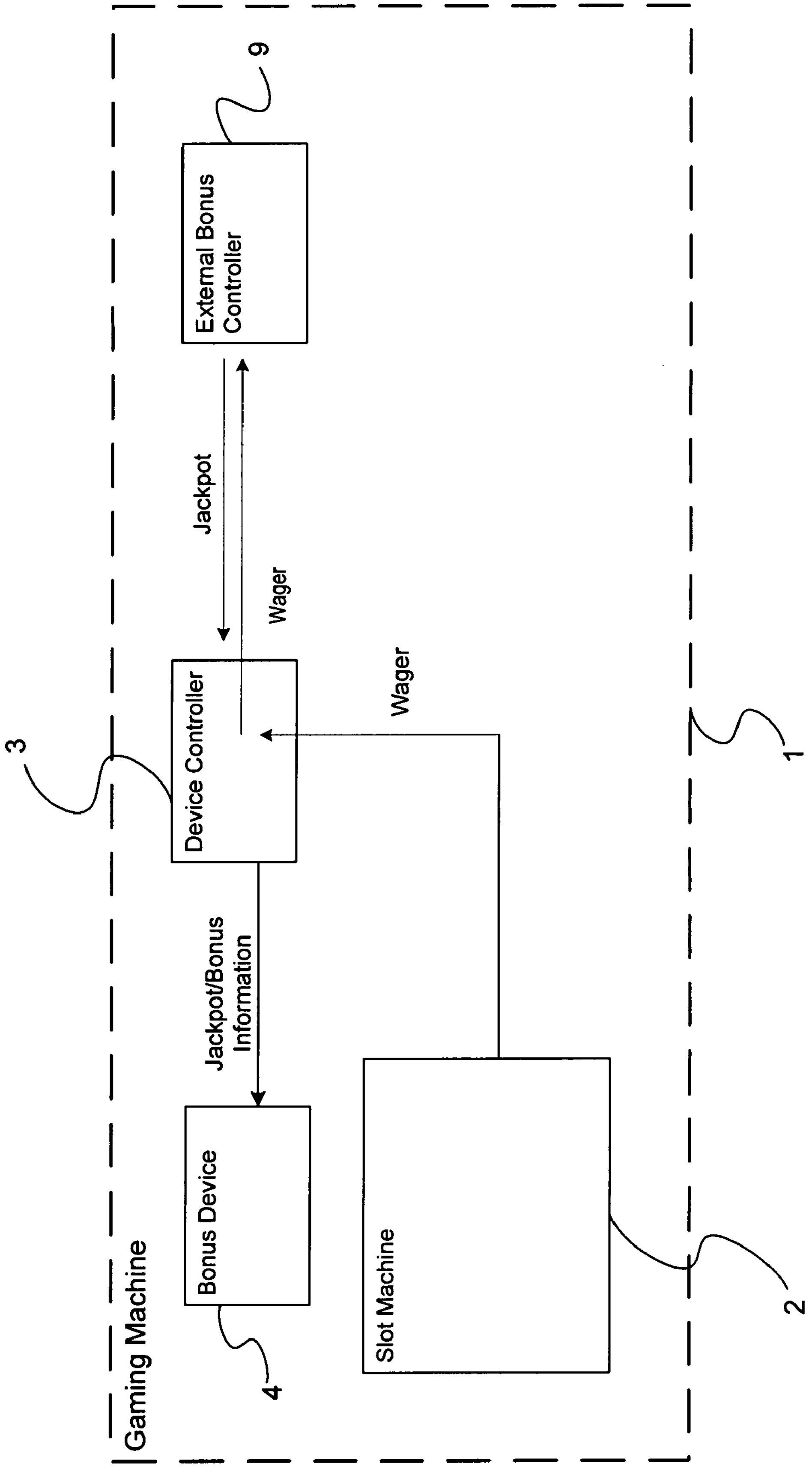
FIG. 5 is a block diagram explaining the gaming machine 1 according to embodiment 3 of the present invention.

FIG. 5 is a block diagram explaining the gaming machine 1 according to embodiment 3 of the present invention. The External Bonus Controller 9 determines a hidden jackpot winning value between the minimum and maximum value before every jackpot cycle starts. When current jackpot reaches the hidden jackpot winning value, the External Bonus Controller 9 takes it that a jackpot hits and a player whose wagers made current value reaching the hidden jackpot value is a winner. In another embodiment of jackpot determination the External Bonus Controller 9 has a pre-fixed winning possibility table (e.g. winning chance is 1-in-1000000 credits bet) and picks up a random number whenever it receives wagers from the Slot Machine 2.

The Device Controller 3 can utilize such jackpot functionalities when they exist or are available by delegating jackpot or bonus determination processes out to the External Bonus Controller 9. In this embodiment 3, it is very advantageous for the Device Controller 3 to give players a variety of bonus experiences.

For example, in the jackpot type that uses a minimum and maximum value, a player can see how close the current jackpot is to a maximum value which the jackpot must hit. In the other type described above, the jackpot value may be big as the value determined by the External Bonus Controller 9. The jackpot controller picks up a random number to decide whether the jackpot hits or not. As the jackpot controller picks up a random number for every wager, the jackpot value is possibly no limit. By this embodiment 3, the Device Controller 3 can utilize such bonus and jackpot experiences without modifying the Device Controller 3.

Figure 6:
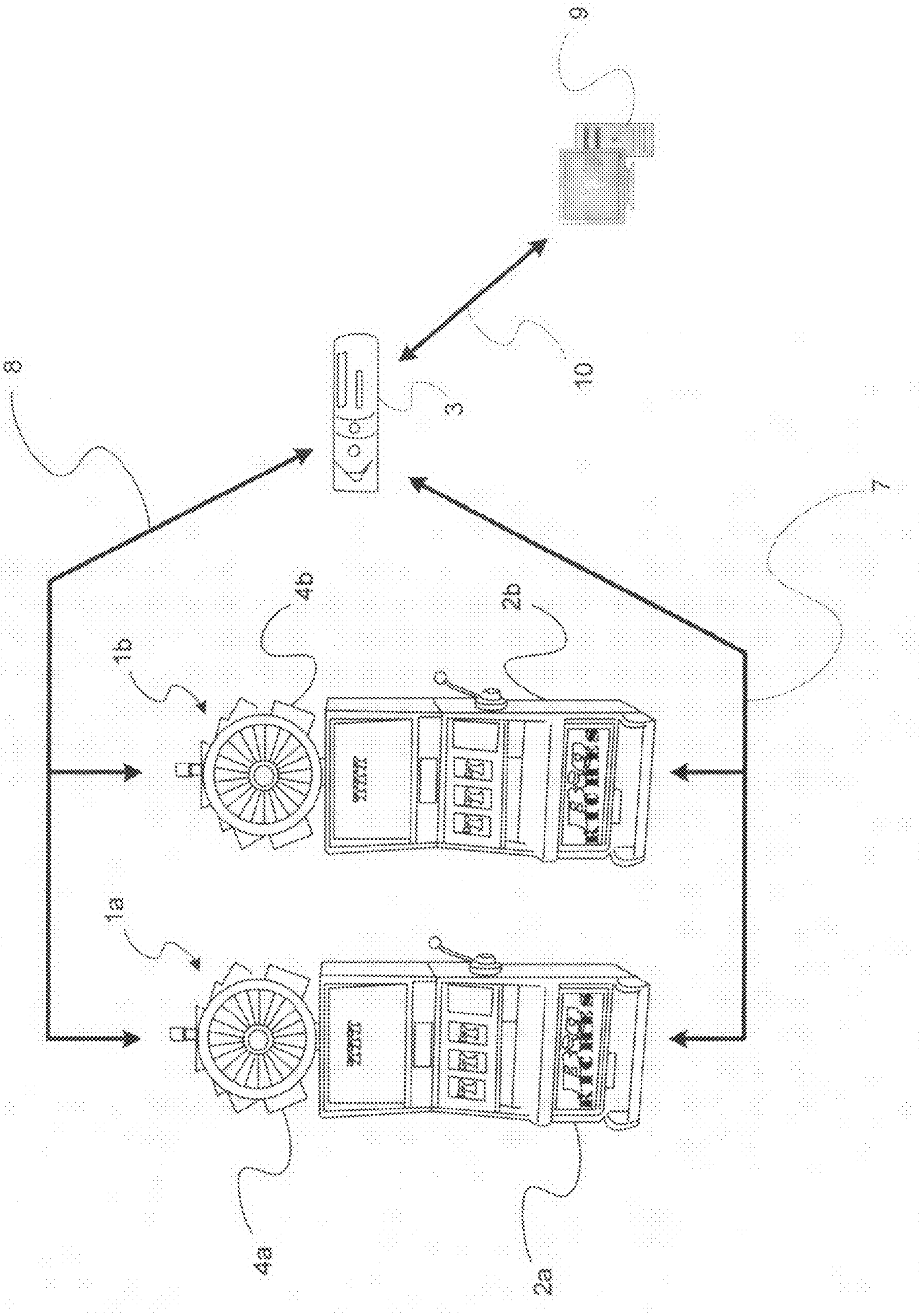
FIG. 6 is a perspective view explaining the gaming machine 1 according to embodiment 4 of the present invention.

FIG. 6 is a perspective view explaining the gaming machine 1 according to embodiment 4 of the present invention. The Slot Machines 2*a* and 2*b* are typically connected to the External Bonus Controller 9 as a casino management system for audit purpose of the Slot Machines 2*a* and 2*b*. Some casino managers' management systems have similar bonus or jackpot functions described above. In the case of the jackpot controller, it is a bank-wide bonus system (e.g. 8 to 10 Slot Machines are grouped in one bank). In contrast, a casino management system managed bonus is a casino-property or casino-group wide bonus system where all Slot Machines in a casino or several casinos in the same casino group are grouped.

Figure 7:
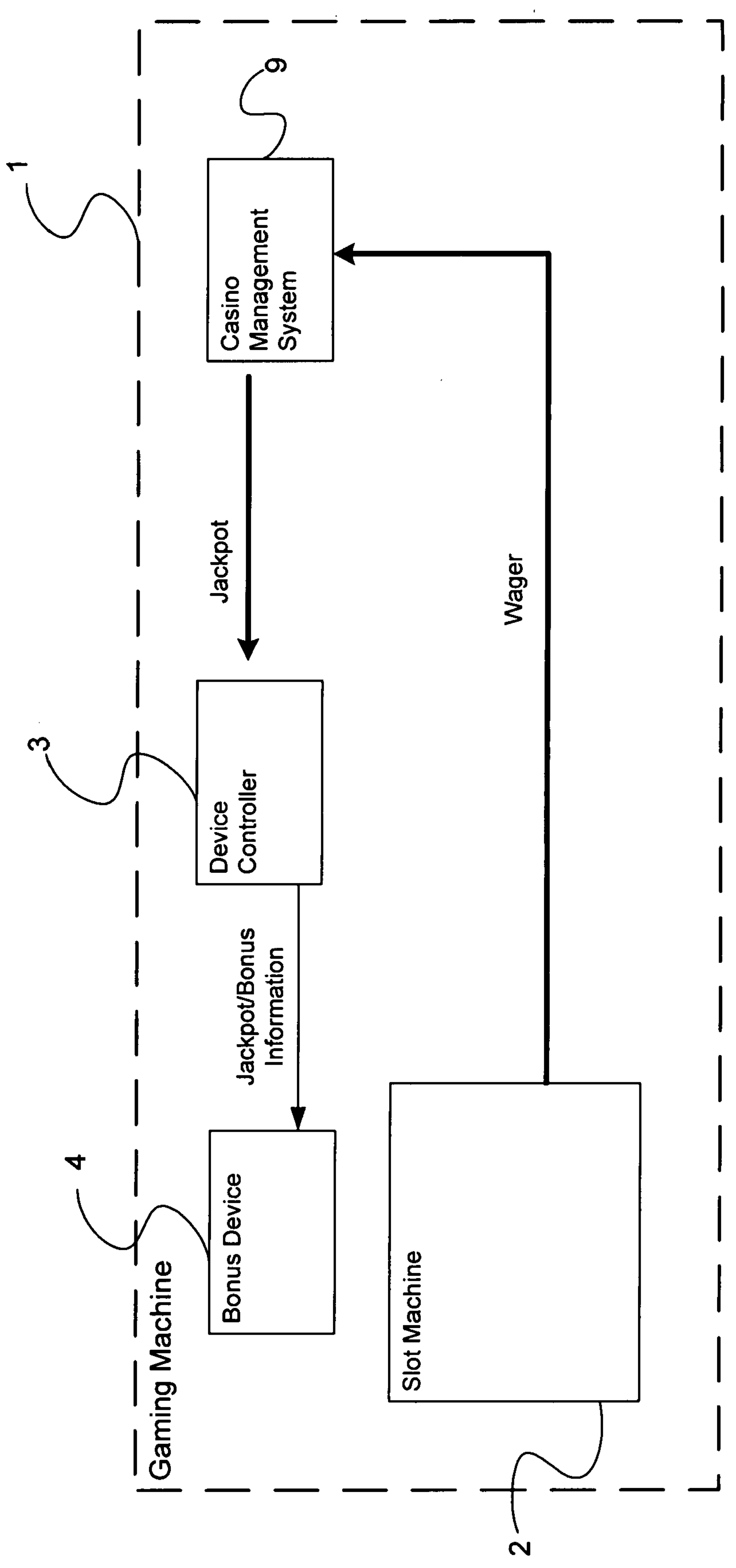
FIG. 7 is a block diagram explaining the gaming machine 1 according to embodiment 4 of the present invention.

FIG. 7 shows a block diagram explaining the gaming machine 1 according to embodiment 4 of the present invention. The External Bonus Controller 9, as a casino management system, receives wager information and account information from the Slot Machine 2. Based on the information from the Slot Machine 2, the External Bonus Controller 9 sends the bonus amount to the Device Controller 3. So, the Device Controller 3 does not take wager information and account information from the Slot Machine 2.

By being capable of communicating with such casino management systems, the Device Controller 3 can utilize another bonus or jackpot experience that two or more Slot Machines in different casino properties can be awarded from the same bonus in the same procedures described above.

It is also advantageous for this embodiment 4 to delegate bonus award procedures to the External Bonus Controller 9. Typically, such casino management systems are designed to award bonuses directly to bonus winners in a similar way of the jackpot controllers. By delegating it to the External Bonus Controller 9, casinos can provide different bonus or jackpot experiences to their customers (players).

Figure 8:
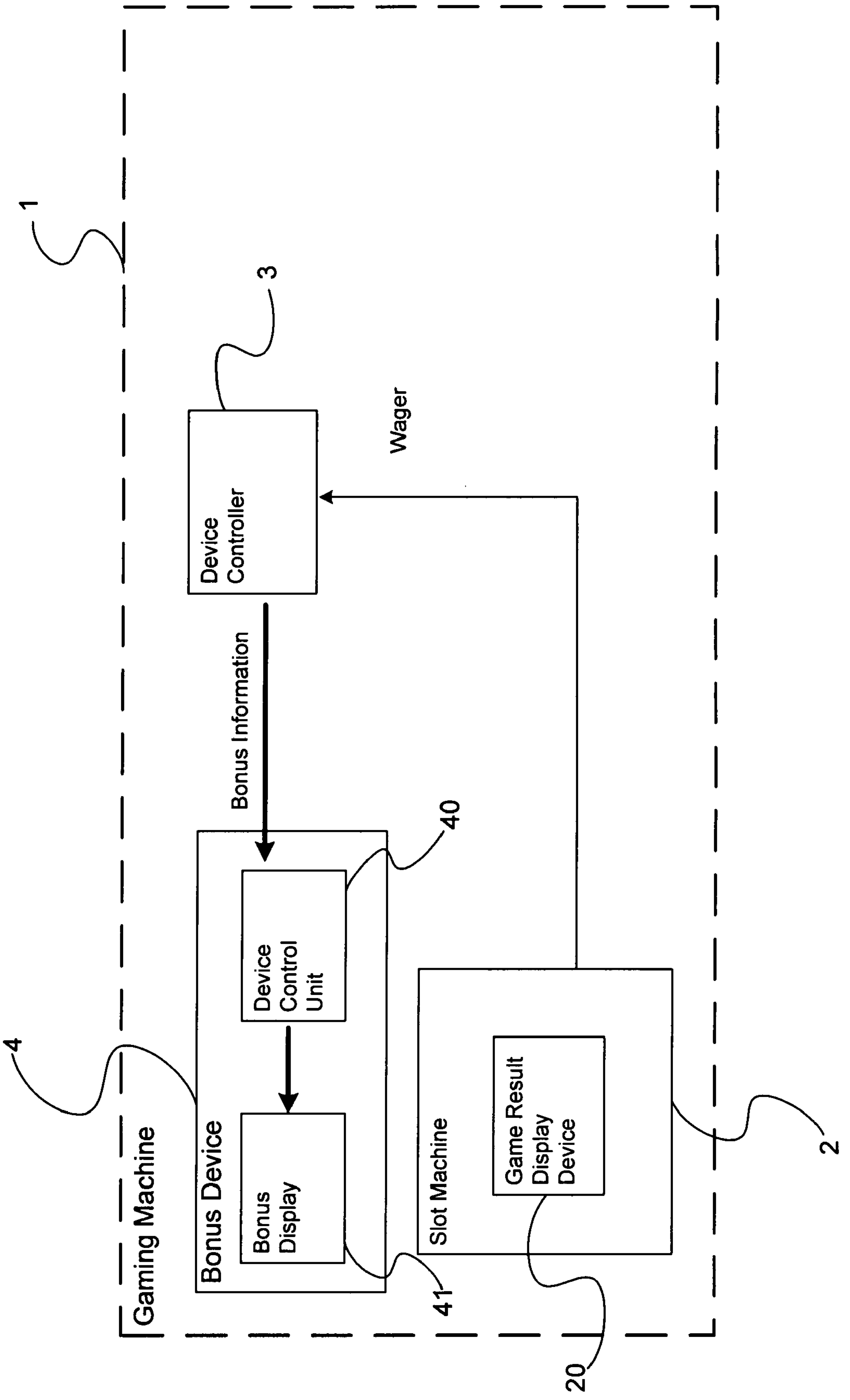
FIG. 8 is a block diagram explaining the gaming machine 1 according to embodiment 5 of the present invention.

FIG. 8 is a block diagram explaining the gaming machine 1 according to embodiment 5 of the present invention. In this embodiment 5, the Bonus Device 4 is a kind of presentation device that shows a bonus amount the Device Controller 3 has decided to a player. The Bonus Device 4 consists of a Device Control Unit 40 which communicates with the Device Controller 3, and a Bonus Display 41 which presents a bonus amount by using the Bonus Device 4 specific methods or devices described herein.

In the embodiment 5 of the Bonus Display 41 is a mechanical movable wheel device like FIG. 1. In the embodiment 5 of the mechanical movable wheel device, the device has several numbers like 10, 20, 100, 200, etc, in separated arcs. The value may be statically and/or dynamically determined and displayed on the device.

Figure 9:
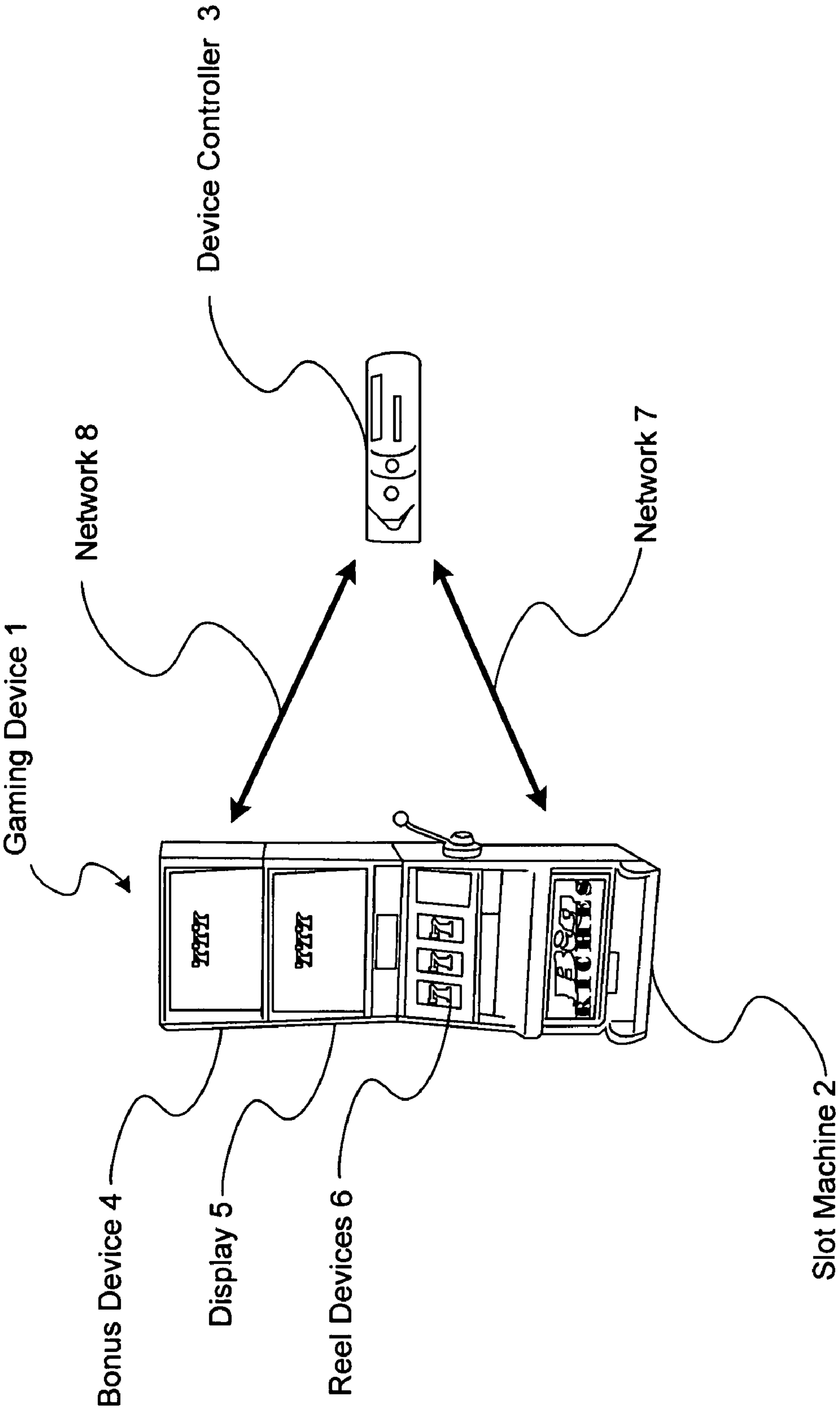
FIG. 9 is a perspective view explaining the gaming machine 1 according to embodiment 6 of the present invention.
Figure 10:
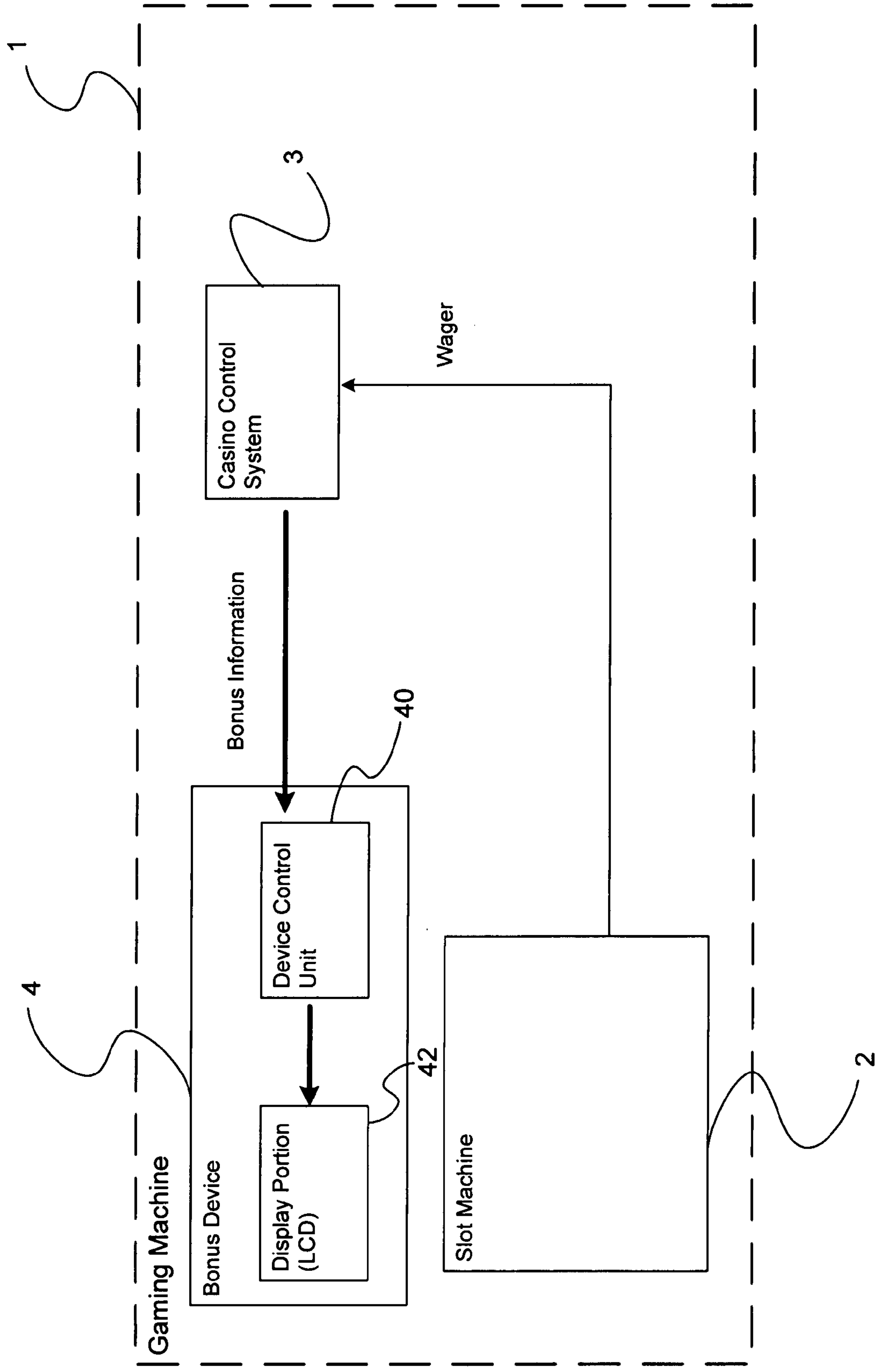
FIG. 10 is a block diagram explaining the gaming machine 1 according to embodiment 6 of the present invention.

FIG. 9 is a perspective view explaining the gaming machine 1 according to embodiment 6 of the present invention. This embodiment 6 has a LCD display as the Bonus Display 42 (shown in FIG. 10). FIG. 10 is a block diagram explaining the gaming machine 1 according to embodiment 6 of the present invention.

In FIG. 10, the dynamic value may be displayed on LCD display or LED dot-matrix display. In FIGS. 9 and 10, the Display 5 and the Bonus Display 42 may be combined with a wide LCD panels or a plasma display.

Figure 11:
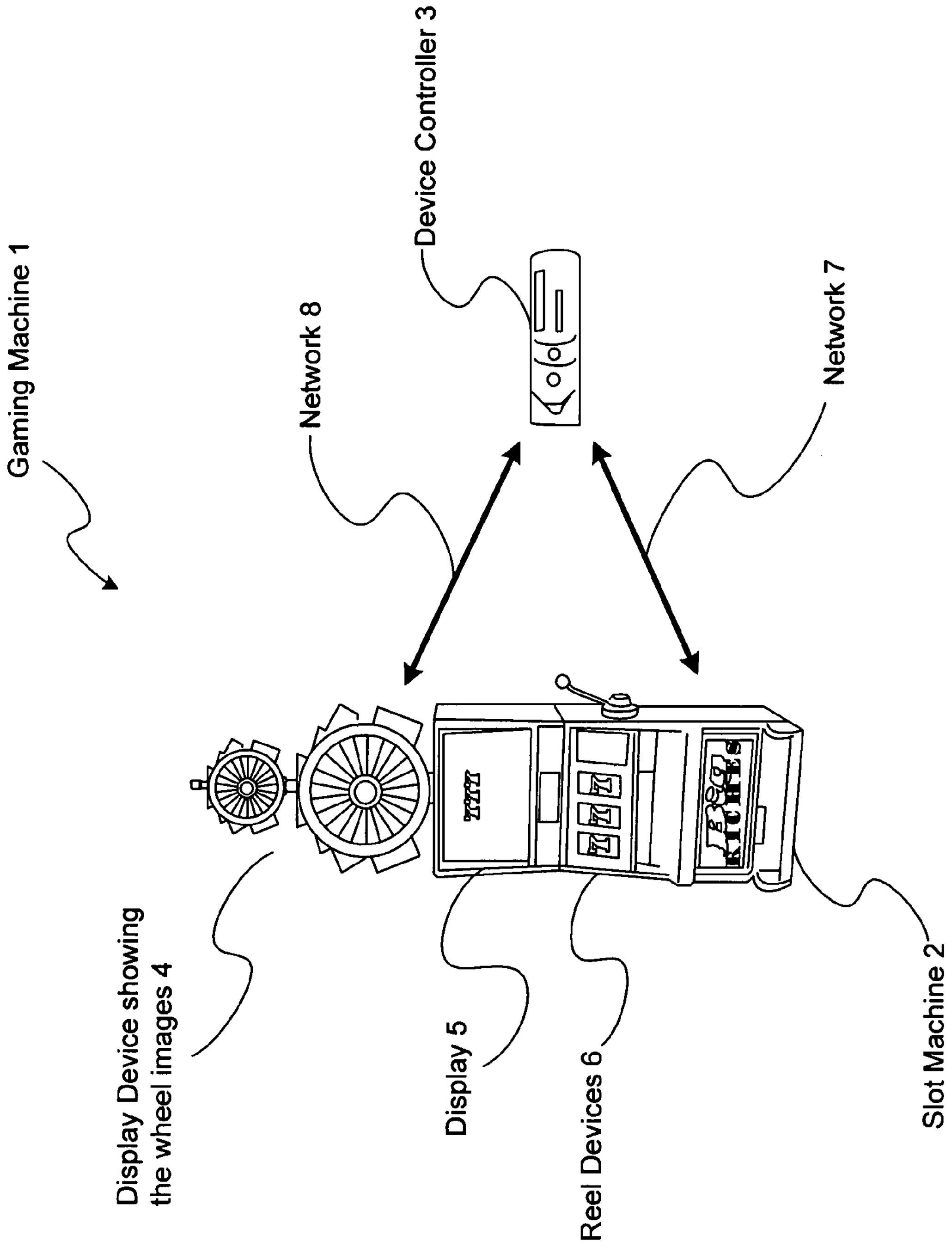
FIG. 11 is a perspective view explaining the gaming machine 1 according to embodiment 7 of the present invention.
Figure 12:
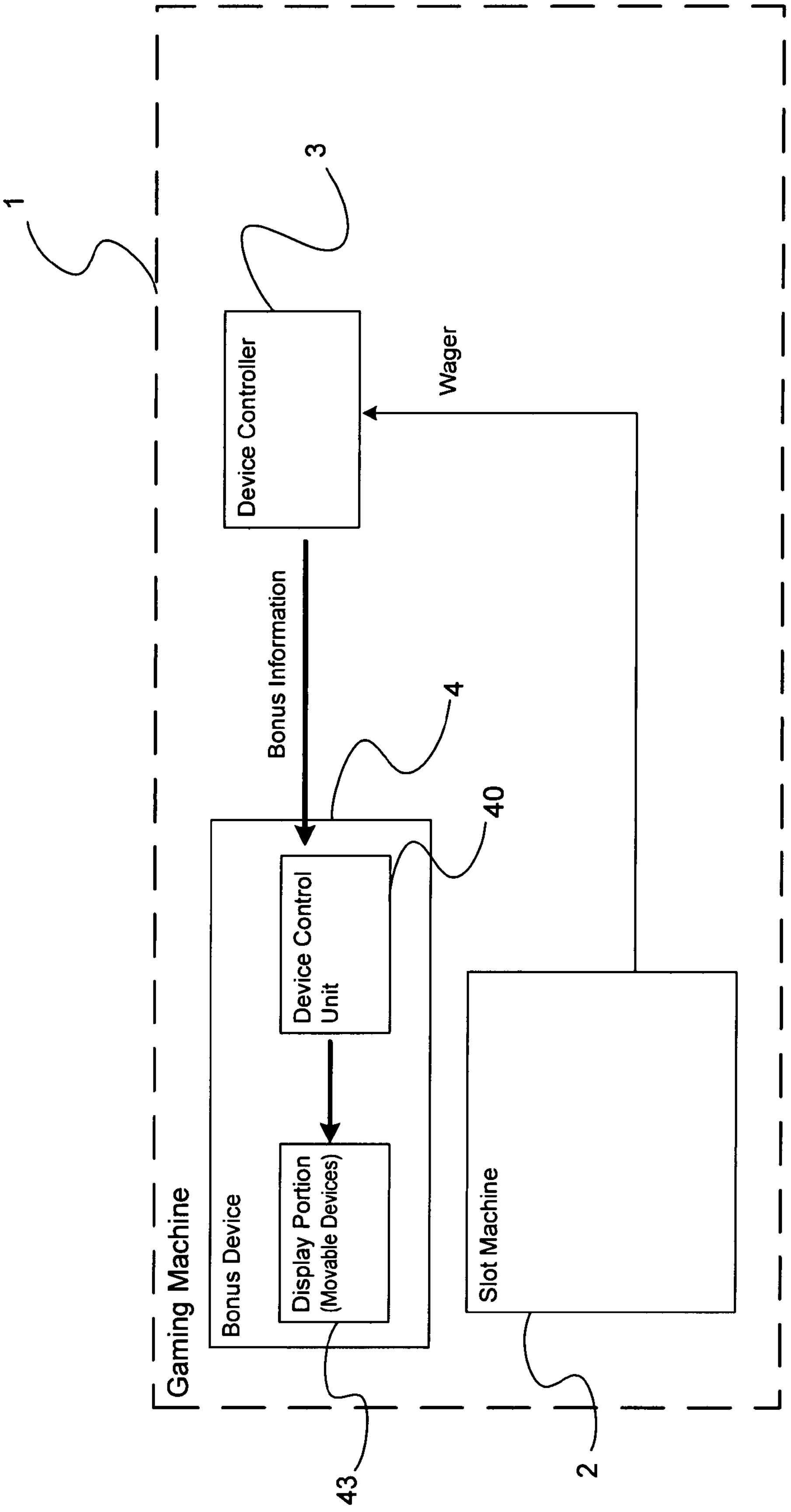
FIG. 12 is a block diagram explaining the gaming machine 1 according to embodiment 7 of the present invention.

FIG. 11 is a perspective view explaining the gaming machine 1 according to embodiment 7 of the present invention. And FIG. 12 is a block diagram explaining the gaming machine 1 according to embodiment 7 of the present invention. The embodiment 7 has one or more movable devices. The movable devices may be placed in one or some Bonus Devices 4.

FIG. 12 is a block diagram explaining the gaming machine 1 according to embodiment 7 of the present invention. Mechanical wheel device 43 as a Bonus Device 4 receives messages from the Device Controller 3 to present a bonus award and has a value of 100 and other values in separated arcs. When a communication between the Bonus Device 4 and the Device Controller 3 is established, the Device Controller 3 retrieves value patterns that are available on the Bonus Device 4.

The value patterns include, but are not limited to, values with a position index, and preferred presentation patterns. Preferred presentation patterns are value combinations by using values that are available in the separated arcs to present a bonus value. For example, movable wheel devices 43 may have values of 10, 20, 50, 100 and 200 in its separated arcs. It can present a value of 100 by rotating the wheel and stopping at a value of 100.

In another combination, it may rotate the wheel and stop at any sequence of 50, 20, 20, 10. In another combination, it has a stop combination of 20, 20, 20, 20, and 20. These three combinations can provide different experiences of bonus awards.

By this embodiment 7, a player may be happy if some wheels rotate again after stopping at small values such as 10 or 20. In order to make it effective, the Bonus Controller can install such preferred presentation patterns with equal or weighted possibilities. One embodiment of the possibilities is that one-stop "100" may be selected in 50%, "50-20-20-10" may be in 30% and the rest may be "20-20-20-20-20".

Figure 13:
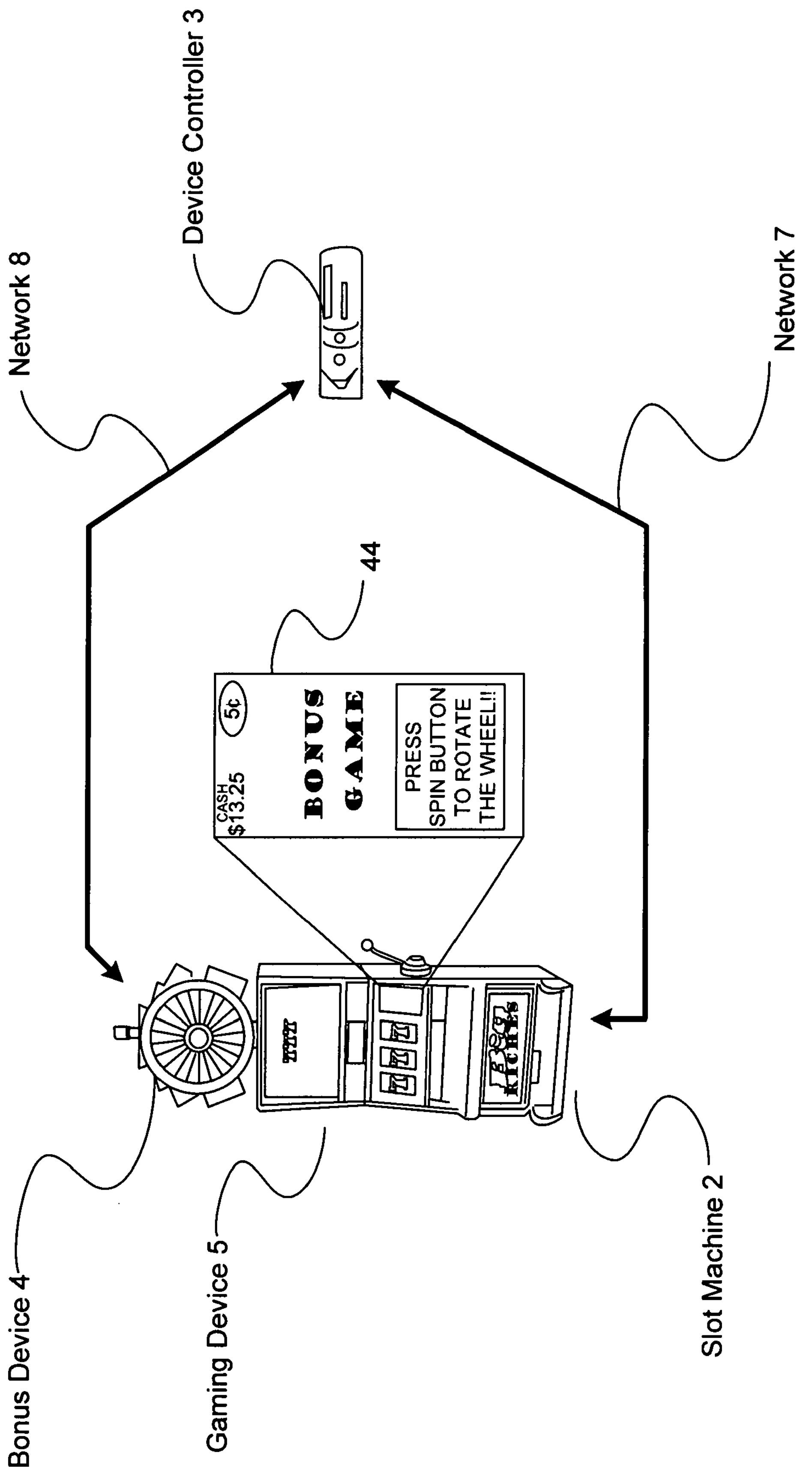
FIG. 13 is a perspective view explaining the gaming machine 1 according to embodiment 6 and 7 of the present invention.

FIG. 13 is a perspective view explaining the gaming machine 1 according to embodiment 6 and 7 of the present invention. Thus, the Gaming Machine 1 has the LCD display as the Bonus Display 42 and the Mechanical wheel devices 43 as the Bonus Display 43. In this embodiment, the Device Controller 3 performs the bonus games with the Bonus Display 42 and the Bonus Display 43.

Also, this Gaming Machine 1 has an illustrative LCD 44 for notifying players of a bonus game. The illustrative LCD 44 is located next to the reel device 6. The Device Controller 3 makes messages for the additional LCD 44 and sends to the Slot Machine 2. In this embodiment, since bonus games are displayed in the several Displays, the illustrative LCD 44 makes it easy for players to understand its multiple bonus game process. In another embodiment, the illustrative LCD 44 may become an additional Bonus Display.

Figure 14:
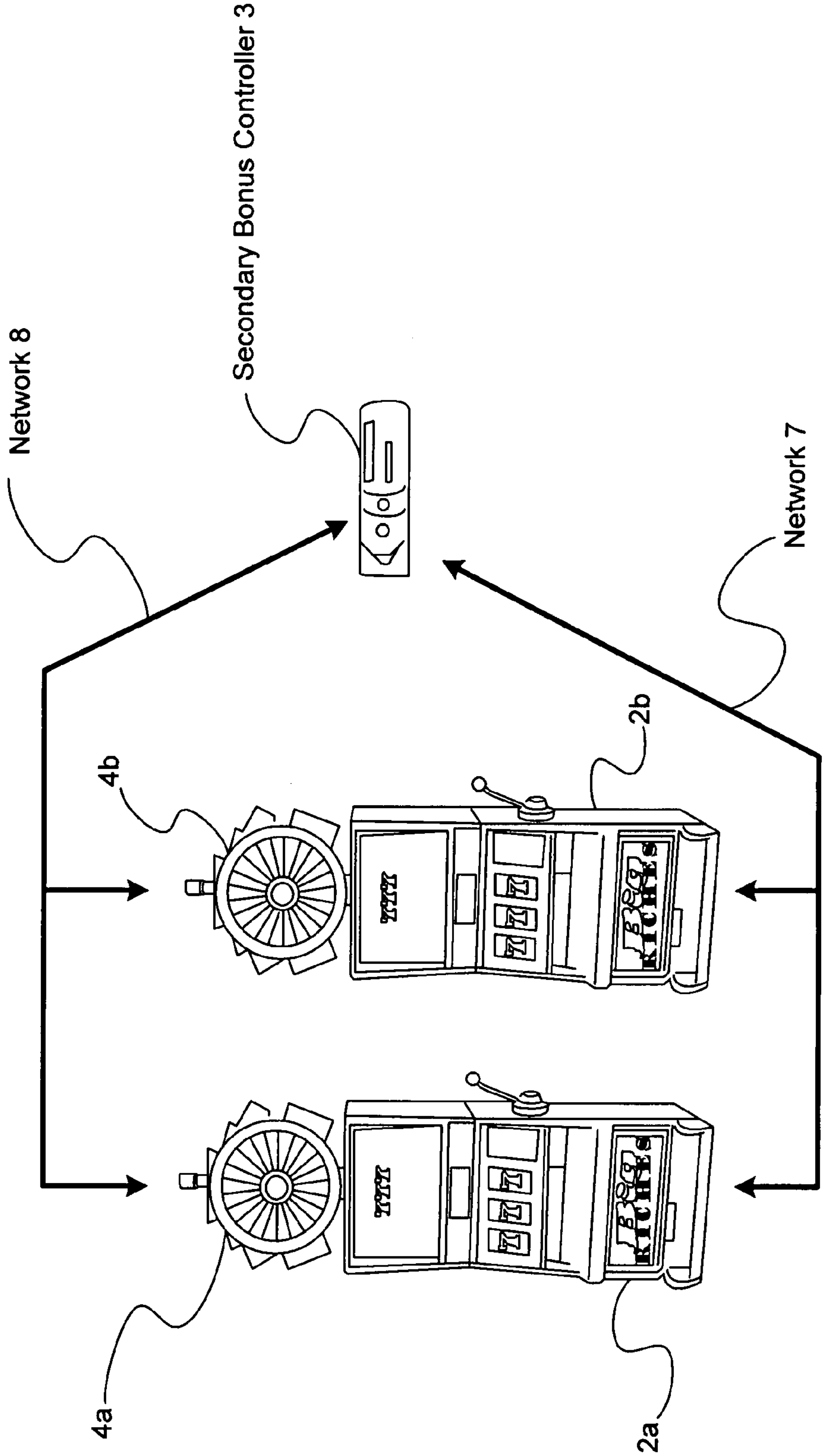
FIG. 14 is a perspective view explaining the gaming machine 1 according to embodiment 8 of the present invention.
Figure 15:
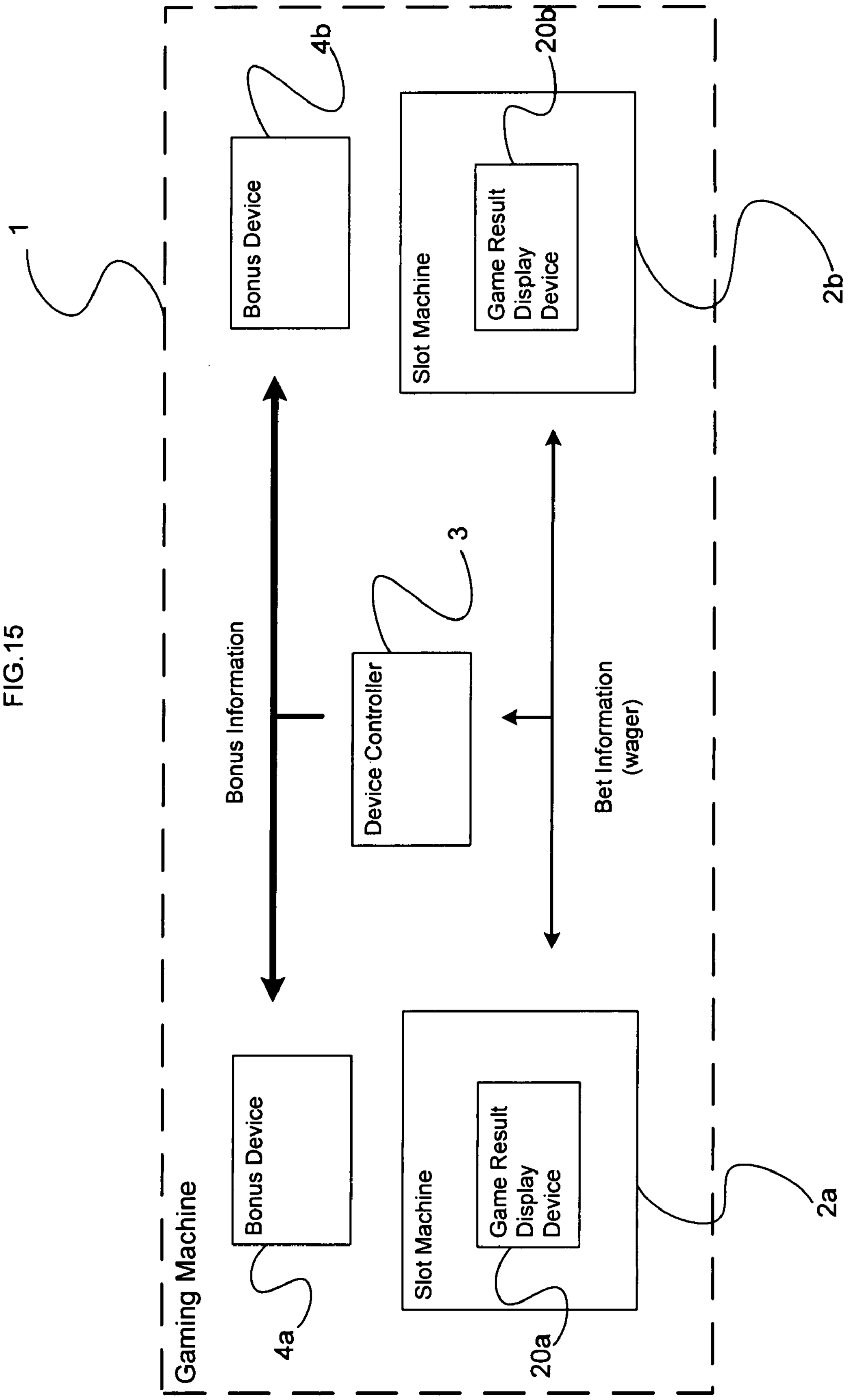
FIG. 15 is a block diagram explaining the gaming machine 1 according to embodiment 8 of the present invention.

FIG. 14 is a perspective view explaining the gaming machine 1 according to embodiment 8 of the present invention. And FIG. 15 shows a block diagram explaining the gaming machine 1 according to embodiment 8 of the present invention. The gaming machine 1 has several Slot Machines 2*a* and 2*b* and the Bonus Devices 4*a* and 4*b*. The Device Control 3 can decide how to present a bonus award by using the Bonus Devices 4*a* and 4*b* connected to the Device Controller 3.

An example of the decision is described above. It selects a presentation combination from preferred presentation patterns if available. The example is typically used in the Gaming Machine 1 which has its own Bonus Device 4*a* or 4*b* on the Slot Machines 2*a* or 2*b*. The Gaming Machine 1 has a mechanical wheel device in the Bonus Device 4*a* or 4*b* to present a bonus award in the same manner described above.

Figure 16:
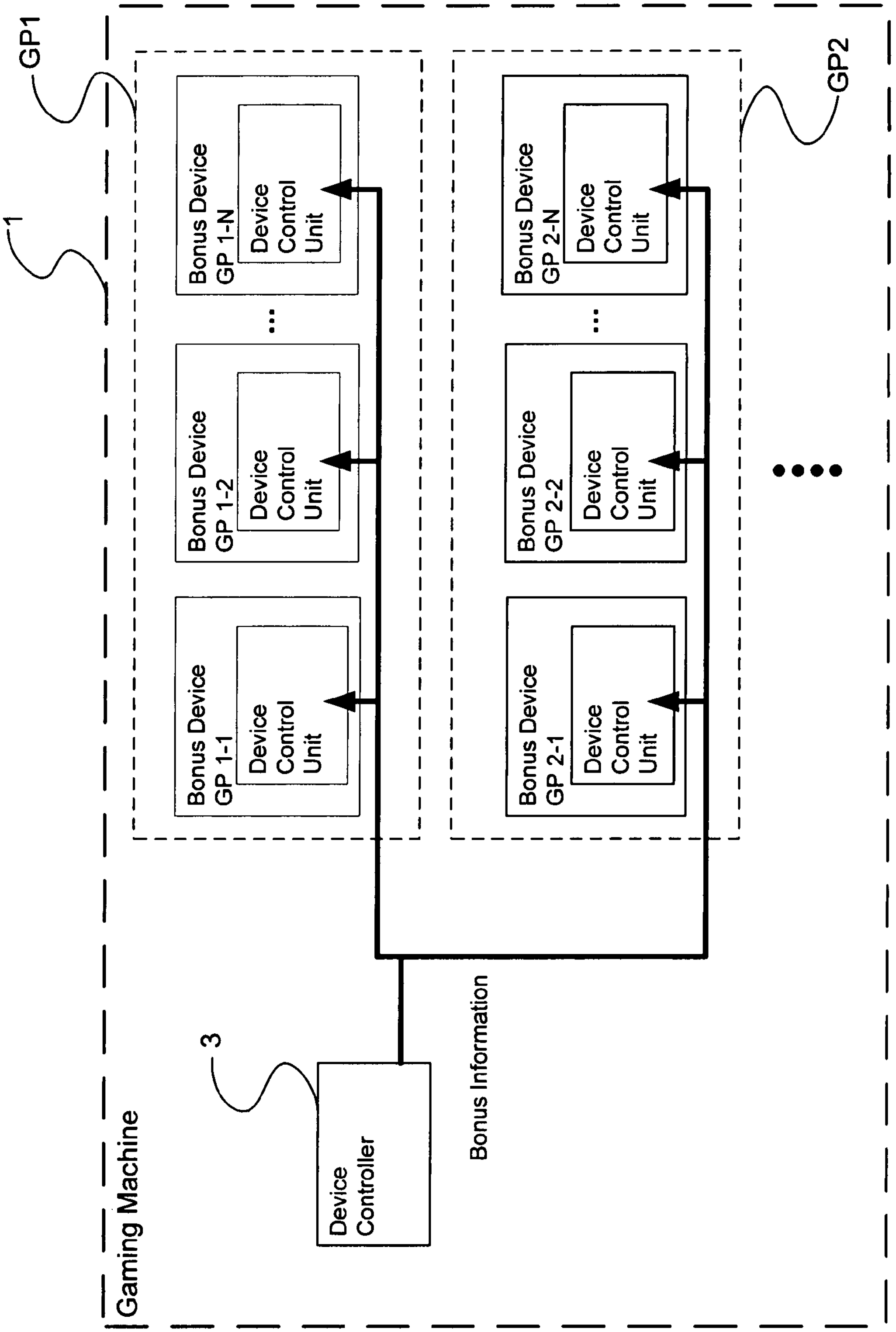
FIG. 16 is a block diagram explaining the gaming machine 1 according to embodiment 9 of the present invention.

FIG. 16 is a block diagram explaining the gaming machine 1 according to embodiment 9 of the present invention. In another usage of multiple Bonus Devices, the multiple Bonus Devices can be grouped into a high value group and a low value group. Each group can have one or more Bonus Devices. In FIG. 16, a Bonus Group GP1 is a high value group and a Bonus Group GP2 is a low value group. The Bonus Group GP1 has a number of the Bonus Devices such as the Bonus Device GP1-1 to GP1-N. Also, The Bonus Group GP2 has the Bonus Device GP2-1 to GP2-N. The Bonus Group GP1 may have higher bonus indications than low value group, the Bonus Group GP2. In a bonus group, a bonus award presentation takes place in the same manner as described above.

In this embodiment 9, there are two bonus groups, a high value group and low value group. High value group contains 4 Bonus Devices that have 1000 and higher values only. Low value group contains 4 Bonus Devices GP1 to GP4 that have values less than 1000 only. When a bonus of 2000 credits hit, the Device Controller 3 may present the bonus of 2000 credits by using the higher value group only. The Device Controller 3 may use the lower value group only or both of the groups. In any of the cases, the Device Controller 3 presents the bonus in the same manner of controlling the Bonus Devices described above. As each value is visible to players, players will be happy if any Bonus Devices in the high value group start moving.

Figure 17:
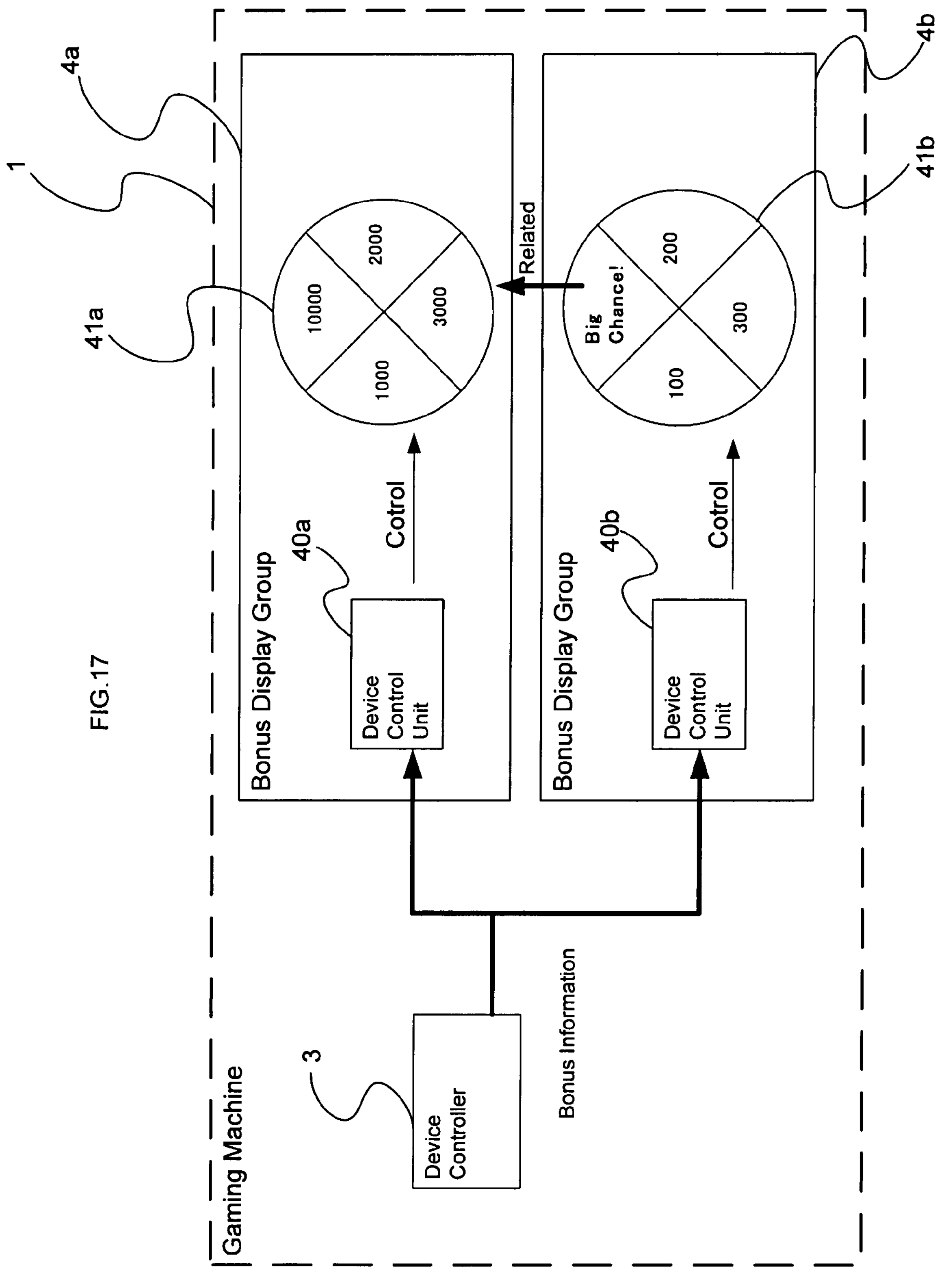
FIG. 17 is a block diagram explaining the gaming machine 1 according to embodiment 10 of the present invention.

FIG. 17 shows a block diagram explaining the gaming machine 1 according to embodiment 10 of the present invention. As explained above, moving of Bonus Devices in the high value group will be more exciting than moving of Bonus Devices in the low value group. In order to make the low value group more exciting, the Bonus Groups can have relation to each other. For example, the Device Controller 3 has two bonus groups; the Bonus Group GP1 as high value group and the Bonus Group GP2 as low value group. The Bonus Group GP1 has a Bonus Device 4*a* and the Bonus Group GP2 has a Bonus Device 4*b*.

Furthermore, the Bonus Device 4*a* has a Device Control Unit 40*a* and a Bonus Display 41*a*. In this embodiment 10, the Bonus Display 41*a* contains values equal to or greater than 1000. Also, the Bonus Device 4*b* has a Device Control Unit 40*b* and a Bonus Display 41*b*. In this embodiment 10, the Bonus Display 41*b* contains values less than 1000 plus one or more Connection Values that may show "Big Chance!"

The Device Controller 3 may decide to use the High Bonus Device, the Bonus Device 4*a* only when a bonus of 2000 credits hits. The Device Controller 3 may use the Bonus Device 4*b* first, stopping at the Connection Value, which results in moving the Bonus Device 4*a* to indicate an actual bonus amount. As the Connection Value is visible to the player, it can make the player expect higher values by the Connection Value, and get the player excited.

Figure 18:
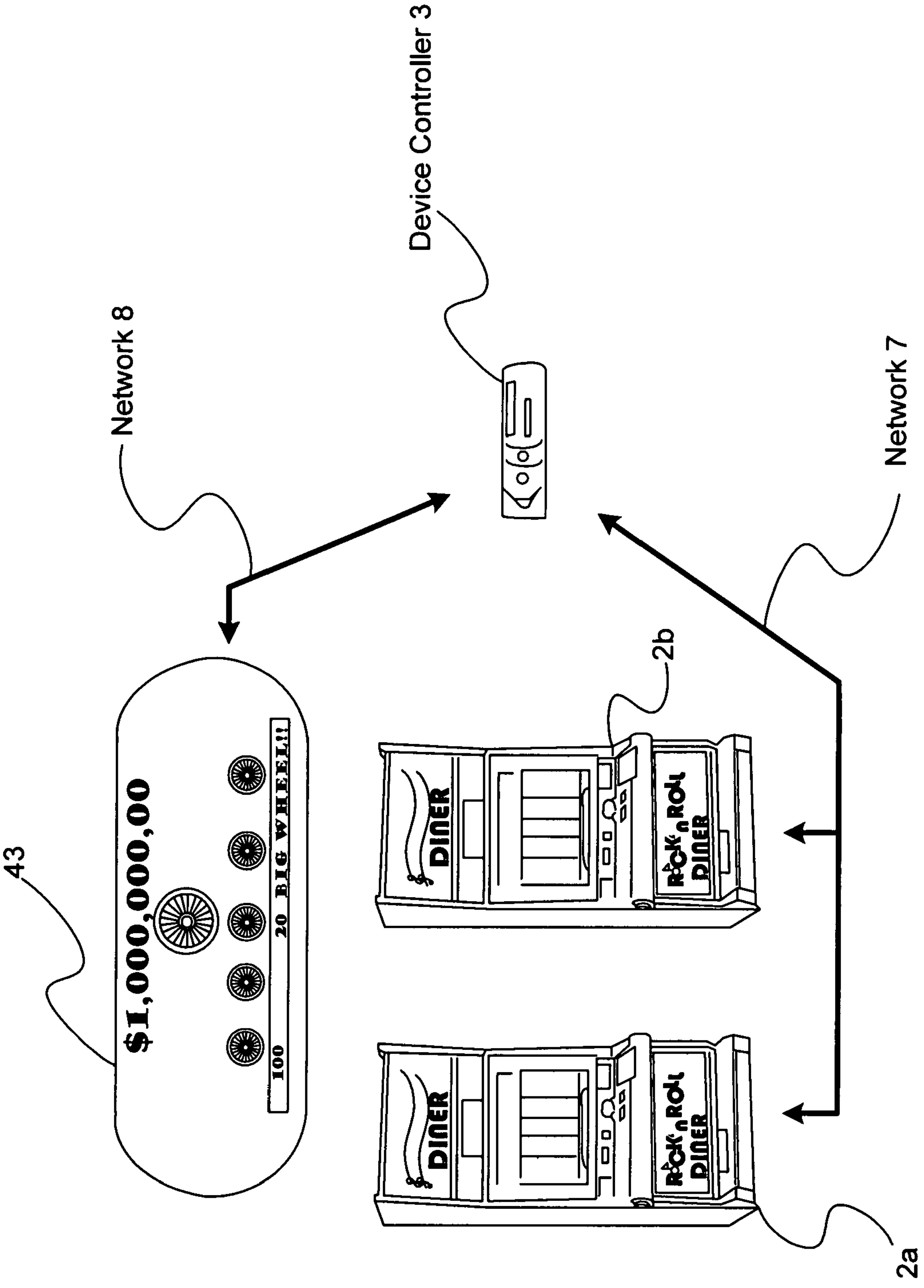
FIG. 18 is a perspective view explaining the gaming machine 1 according to embodiment 11 of the present invention.

FIG. 18 is a perspective view explaining the gaming machine 1 according to embodiment 11 of the present invention. The Bonus Device can be placed off Slot Machines 2*a* or 2*b*. For example, 8 Slot Machines are placed in a slot bank and one Bonus Device 3 using a Mechanical Wheel Device 43 is placed over the Slot Machines. None of the Slot Machines have their own Bonus Device. In this example, the Bonus Device is shared among the Slot Machines. In this embodiment 11, all the Slot Machines are connected to one Device Controller and the Bonus Controller is also connected to the Device Controller.

Figure 19:
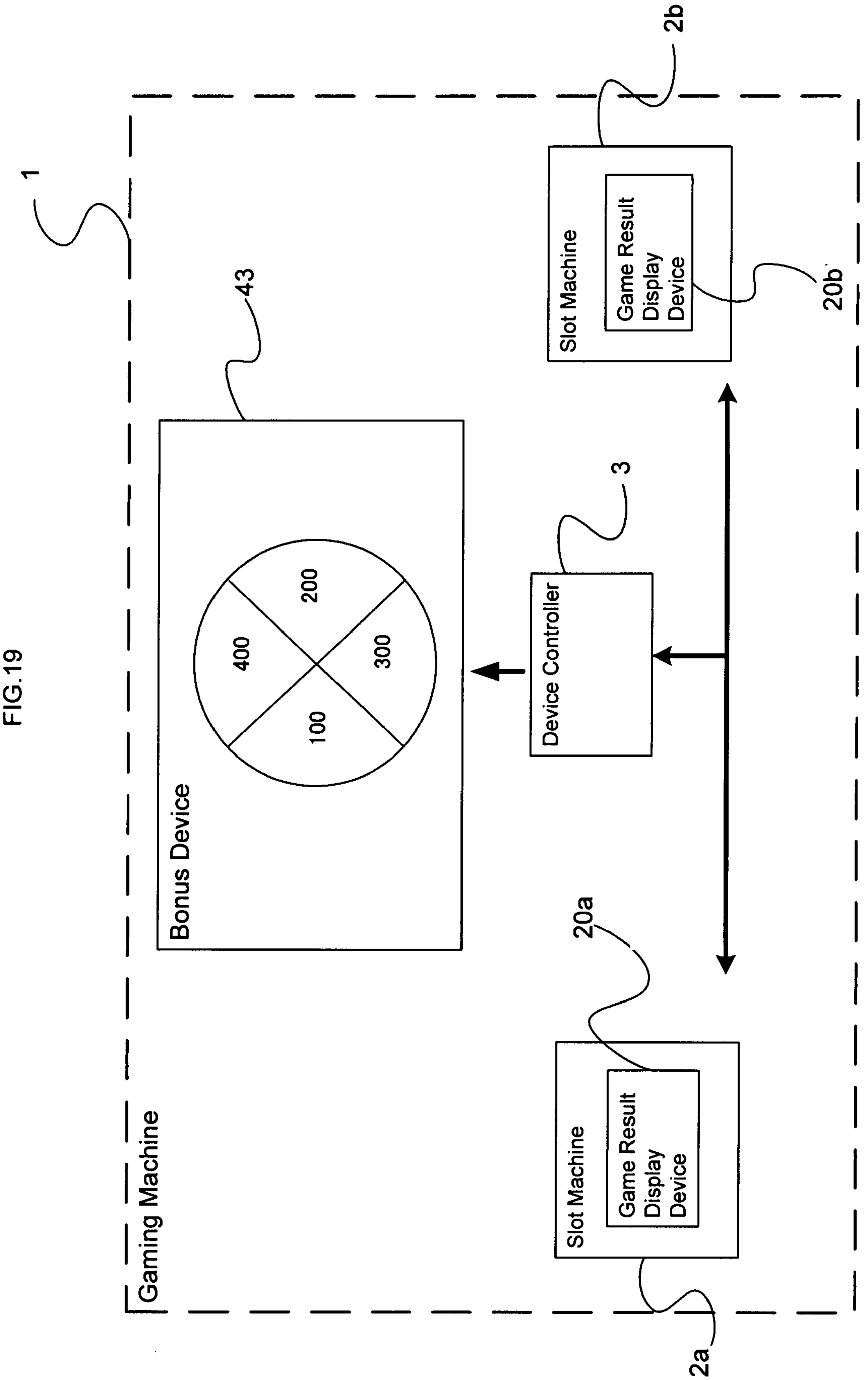
FIG. 19 is a block diagram explaining the gaming machine 1 according to embodiment 11 of the present invention.

FIG. 19 is a block diagram explaining the gaming machine 1 according to embodiment 11 of the present invention. When a bonus hits in the slot bank, the Device Controller 3 decides which Slot Machines 2*a* to 2*b* will be awarded the bonus and its amount. For example, a bonus of 100 credits hits and the Device Controller 3 decides that Slot Machine 2*b* is the winner. The Device Controller sends the Game Result Display Device 20*b* a message indicating that a bonus award is ready. After the Slot Machine 2*b* is ready to accept the bonus, it sends a "Ready" message back. Then, the Device Controller 3 receives the "Ready" message and starts to present a bonus award in the same manner using the Bonus Device 4 described above.

In another example for the embodiment 11, a bonus of 100 credits hits and the Device Controller 3 decides that the Slot Machines 2*a* and 2*b* are the winners and are awarded 50 credits each. The Device Controller 3 does the same procedures described above for the Slot Machine 2*a*, and then 2*b* in a row. The awards to Slot Machines 2*a* and 2*b* may be weighted, and the Slot Machine 2*a* may be awarded 70 credits and the Slot Machine 2*b* may be awarded 30 credits. In these cases, the Bonus Device 4 is shared by the Slot Machines 2*a* and 2*b*.

In another sharing model, a slot bank has 8 Slot Machines and 4 Bonus Devices such as wheel devices 43 that are shared among the Slot Machines. These Bonus Devices can have completely same bonus value patterns or different value patterns, which the Device Controller 3 retrieves value patterns in the same manner described above when communications are established.

The Device Controller 3 can present a bonus award by using one or more Bonus Devices. For example, a bonus of 1000 credits hits and the Device Controller 3 decides that the Slot Machine 2*d* is the winner and also decides that the Device Controller 3 presents the value of 1000 by moving and stopping the Bonus Devices at 200 on Bonus Device 4*a*, at 100 on Bonus Device 4*b*, at 500 on Bonus Device 4*c*, and at 200 on Bonus Device 4*d* (Bonus Devices 4*c* and 4*d* not shown). The bonus presentation and award processes are the same as described above.

If the Device Controller 3 decides to award a bonus to more than one player, the Device Controller 3 does the same procedures for corresponding Slot Machines in the same manner as described above.

Figure 20:
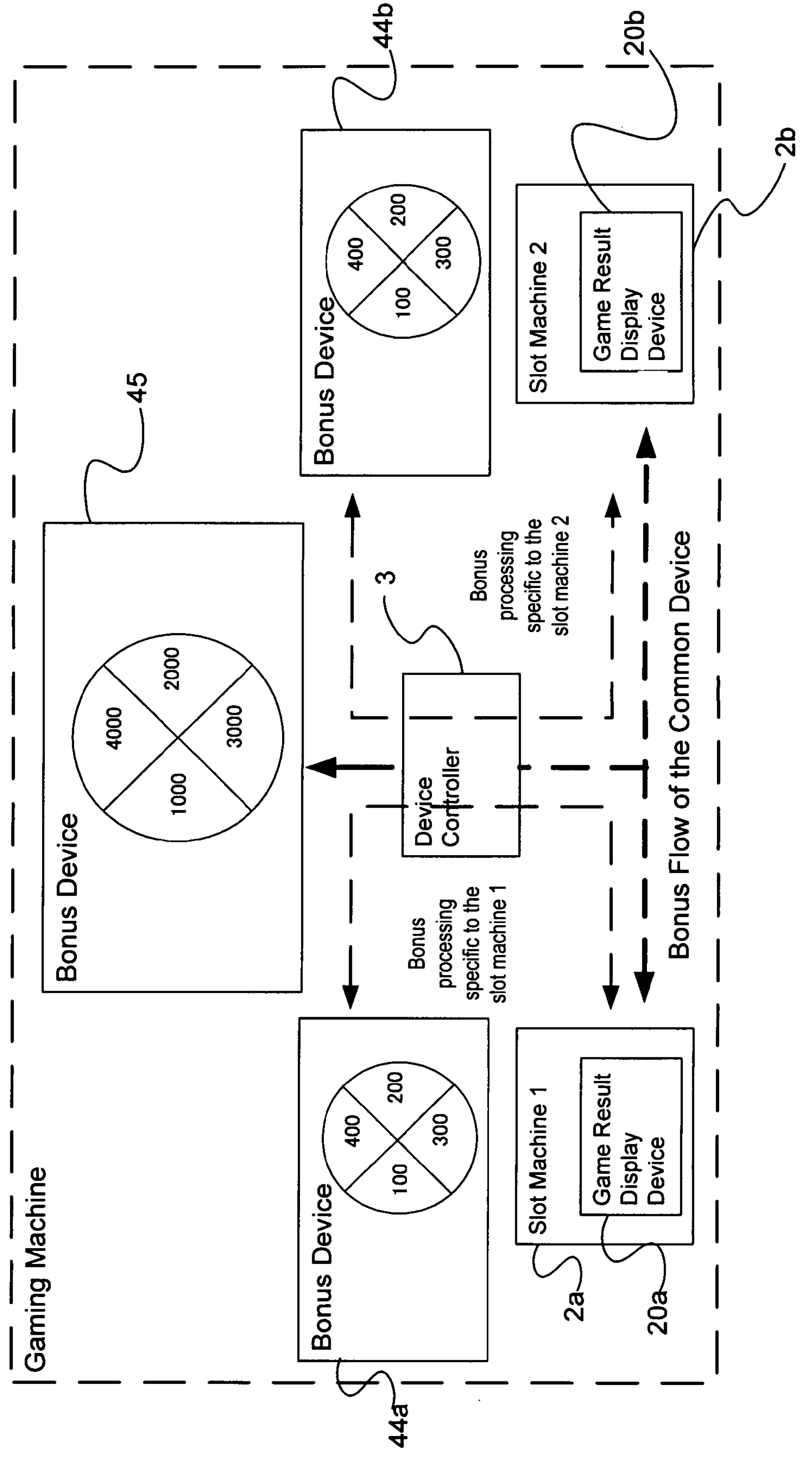
FIG. 20 is a block diagram explaining the gaming machine 1 according to embodiment 12 of the present invention.

FIG. 20 shows a block diagram explaining the gaming machine 1 according to embodiment 12 of the present invention. In FIG. 12, a plurality of Slot Machines 2*a* and 2*b* further have individual Bonus Devices 44*a* and 44*b* besides a Bonus Device 45.

In this embodiment 12, the Device Controller 3 decides the Slot Machine 2*a* is a winner and picks up Slot Machine 2*b* and 2*c* (2*c* not shown) as other players who will not be awarded. The Device Controller 3 notices all the players that one of the players will be awarded a bonus which will be presented at the High Bonus Group, and the bonus winner will be presented by which the Low Bonus Group on the players' Slot Machine.

The winner will be the player who will get the largest value displayed on the Low Bonus Group in the following bonus presentation. The Device Controller 3 moves all the Bonus Devices in the Low Bonus Group on the Slot Machine 2*a*, 2*b* and 2*c* (2*c* not shown), and will stop Slot Machine 2*a*'s Bonus Device 44*a* at a value of 400, 2*b*'s Bonus Device 44*b* at 100 and 2*c*'s Bonus Device 44*c* at 200 (44*c* not shown). Then, the Device Controller 3 notices that Slot Machine 2*a* is the winner and starts moving the Bonus Devices 43 in the High Bonus Group to present the bonus value the player at the Slot Machine 2*a* will be awarded.

Figure 21:
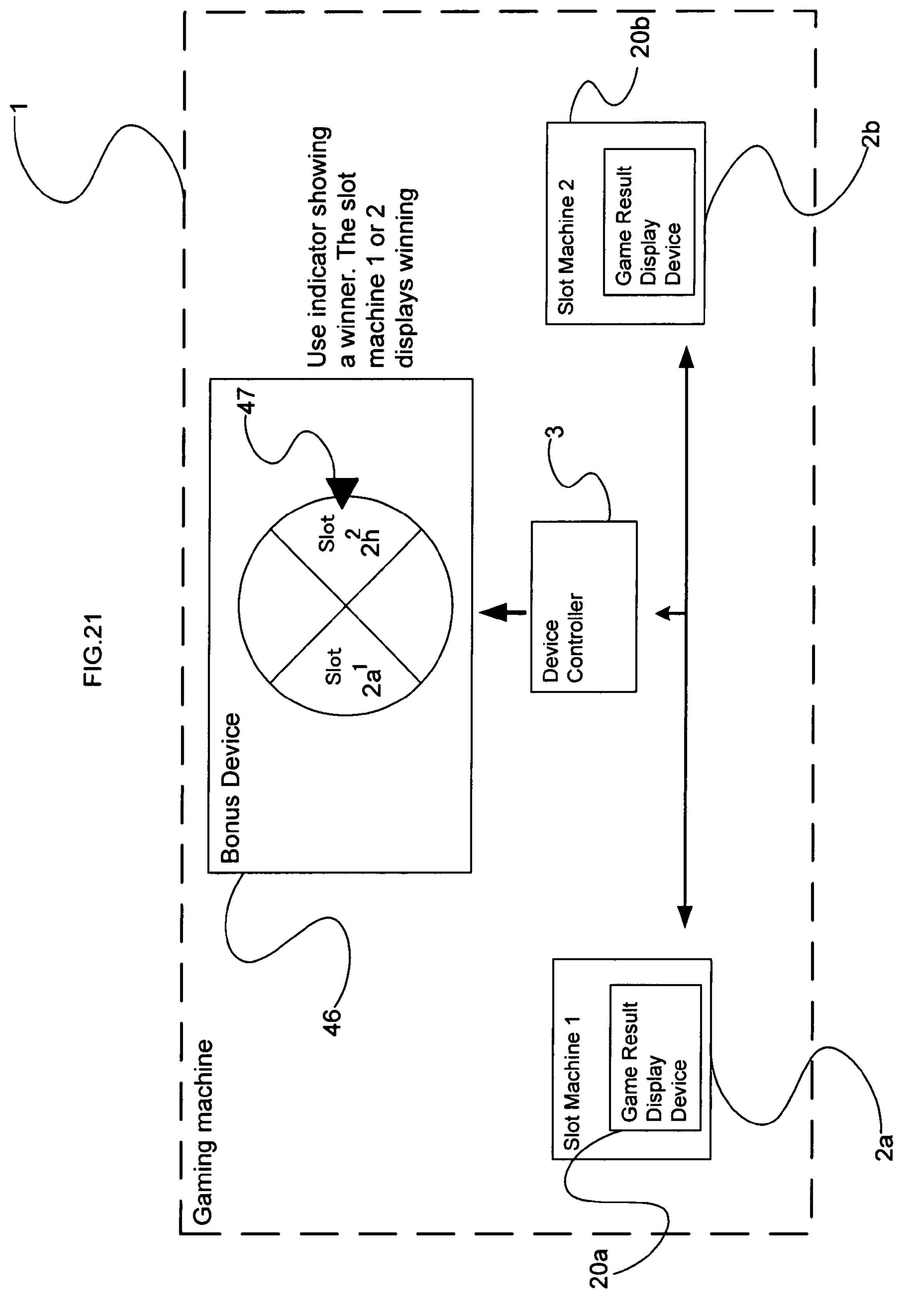
FIG. 21 is a block diagram explaining the gaming machine 1 according to embodiment 13 of the present invention.

FIG. 21 is a block diagram explaining the gaming machine 1 according to embodiment 13 of the present invention. In embodiment 13, the Device Controller 3 can use the shared Bonus Device 46 to present two or more bonus winners simultaneously.

In this embodiment 13, multiple Slot Machines are connected to the Device Controller 3, and one shared Bonus Device 46 is also connected to the Device Controller 3. The shared Bonus Device 46 displays Slot Machine numbers in the slot bank instead of specific bonus values. Bonus values may be displayed anywhere else on the shared Bonus Device 46.

When a bonus hits, the Device Controller 3 determines players who are eligible for the bonus in the same manner described above and single out a winner of the bonus from the players. The Device Controller 3 notices the players that the shared Bonus Device 46 will indicate a winner of the bonus, and then starts moving the Bonus Device 46 by sending messages. Upon receiving the messages, the Bonus Device 46 starts moving and stops at the slot machine number indicating the winner the messages specify. An indicator 47 indicates the winner's slot machine number, for example, in FIG. 21, the Slot Machine 2*b* is a winner.

If the Slot Machine 2*b* is selected as the winner, the Bonus Device 46 stops at the number for the Slot Machine 2*b*. After the presentation, the Device Controller 3 awards the Slot Machine 2*b* the bonus in the same manner described above.

Figure 22:
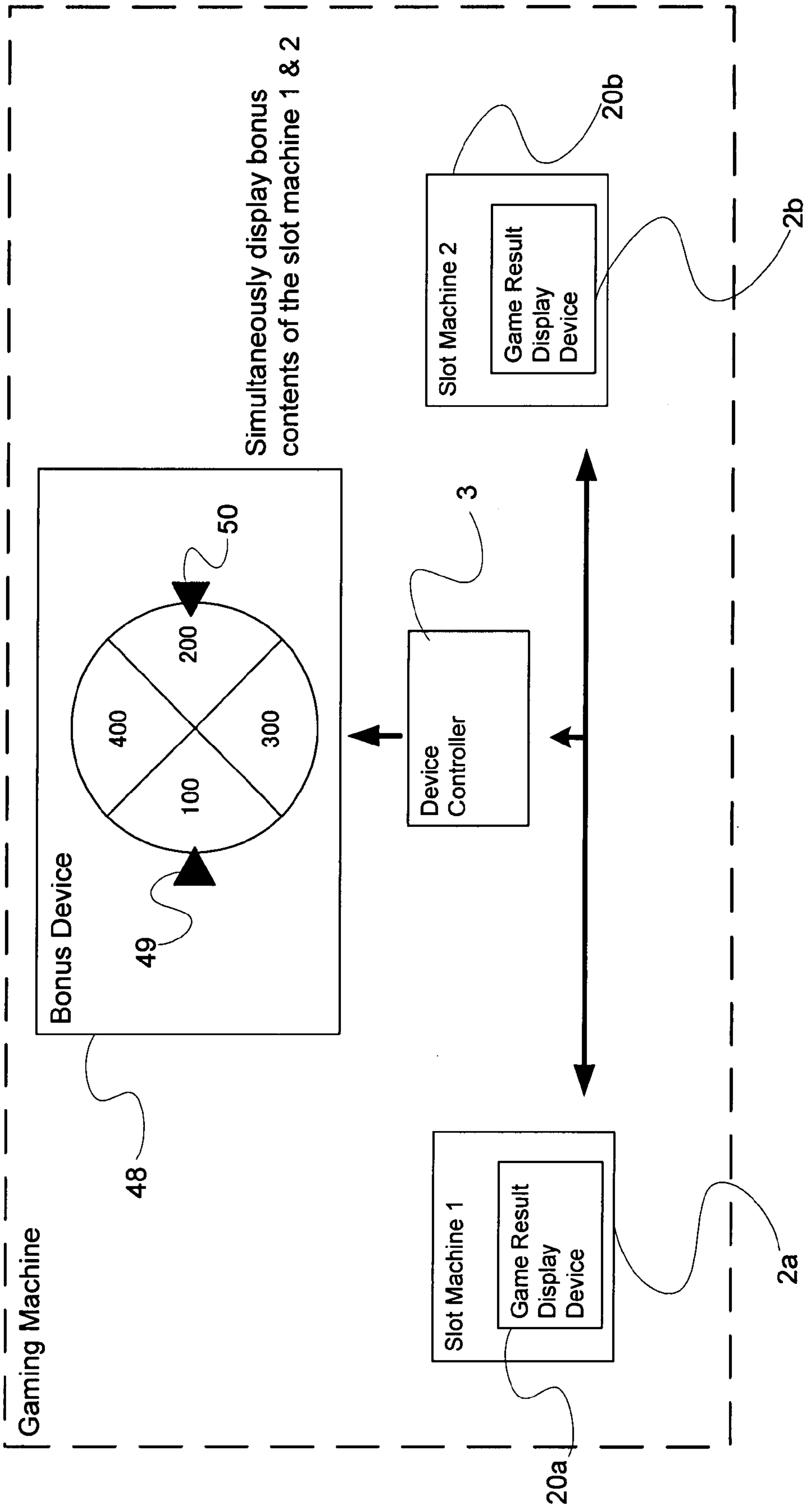
FIG. 22 is another block diagram explaining the gaming machine 1 according to embodiment 13 of the present invention.

FIG. 22 is another block diagram explaining the gaming machine 1 according to embodiment 13 of the present invention. In FIG. 22, the Device Controller 3 can present bonus awards for two or more players with the Bonus Device 48 simultaneously. In this embodiment 13, the Bonus Device 48 has 4 bonus values plus two indicators 49 and 50 that will indicate a bonus value for each slot machine respectively.

When a bonus hits, the Device Controller 3 determines one or two winners and their bonus values, then notifies the players that the Bonus Device 48 presents the players' bonus. The Device Controller 3 sends messages to the Bonus Device 48 to present the bonuses. The indicators 49 and 50 show Slot Machine numbers of the players, which is specified by the messages from the Device Controller 3. The Bonus Device 48 moves and stops at the expected position the messages specify. In FIG. 22, the Slot Machines 2*a* and 2*b* are the winners and are awarded 100 and 200 respectively.

Figure 23:
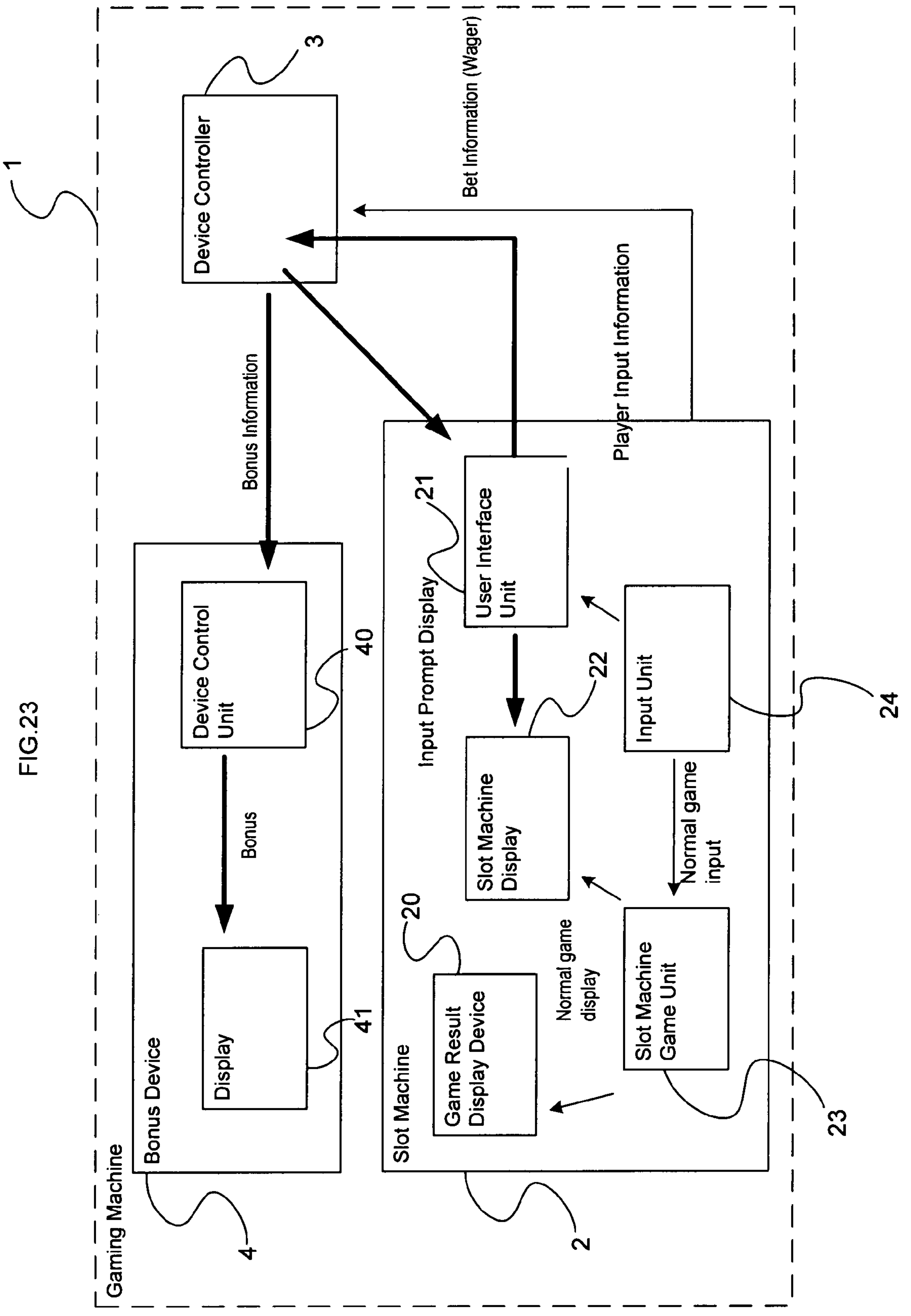
FIG. 23 is a block diagram explaining the gaming machine 1 according to embodiment 14 of the present invention.

FIG. 23 is a block diagram explaining the gaming machine 1 according to embodiment 14 of the present invention. The Gaming Machine 1 has the Slot Machine 2, the Device Controller 3 and the Bonus Device 4. The Slot Machine 2 has the Gaming Result Display Device 20, a User Interface Unit 21, a Slot Machine Display 22, a Slot Machine Game Unit 23 and an Input Unit 24.

The Gaming Result Display Device 20 displays player's gaming result, the User Interface Unit 21 communicates with the Device Controller 3, a Slot Machine Display 22 displays an outputs from the Device Controller 3 and/or the Slot Machine Game Unit 23, the Slot Machine Game Unit 23 controls normal slot machine gaming play and an Input Unit 24 accepts a player's input.

In this embodiment 14, a bonus hits randomly outside the Slot Machine 2, and it is presented by the Bonus Device 4 that is not a portion of normal slot machine gaming play provided by the Slot Machine Game Unit 23, and then it is awarded to a player at the Slot Machine 2. As it is a random hit bonus award, the Bonus Device 4 may suddenly move and a bonus is awarded suddenly with no relation to the Slot Machine Game Unit 23.

A player whose Bonus Device 4 on his/her Slot Machine 2 is moving may not understand what is going on the Bonus Device and to him/herself. In order for players to have fun of bonus awards with this gaming machine, the gaming machine provides a mechanism to address the player notification.

The Slot Machine 2 further has the User Interface Unit 21 which is a plug-able application to a Slot Machine 2 in order to use Slot Machine 2 based on specific input from the Input Unit 24 such as buttons and touch panel devices, and makes output to the Slot Machine Display 22 such as lamps and LCD displays.

The User Interface Unit 21 communicates with the Device Controller 3 over networks. The networks may be the same networks the Slot Machine 2 communicates with the Device Controller 3. The User Interface Unit 21 is intended to notice a player that a bonus hits and the Device Controller 3 makes a Bonus Display Information to the Device Control Unit 40. And then, the Device Control Unit 40 makes a Bonus Display and sends to the Display 41 of the Bonus Device 4. A player will be awarded after showing its amount by the Bonus Device 4.

Figure 24:
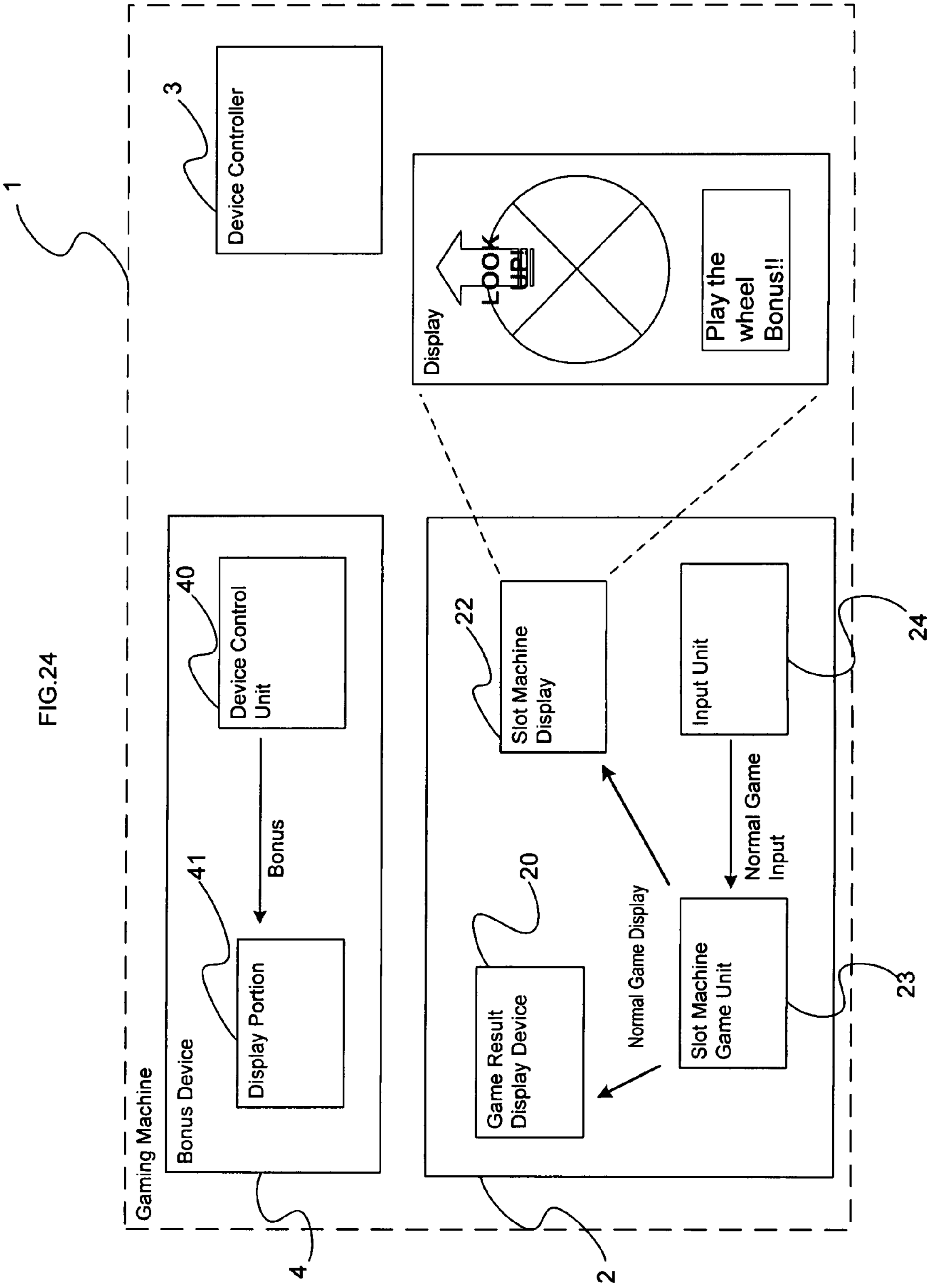
FIG. 24 is a block diagram explaining the gaming machine 1 according to embodiment 15 of the present invention.

FIG. 24 is a block diagram explaining the gaming machine 1 according to embodiment 15 of the present invention. In this embodiment 15, when a bonus hits and the Device Controller 3 decides winners of the bonus and its amount for winners, the Device Controller 3 can send messages to the User Interface Unit 21 of the Slot Machine 2 of the winners before presenting the bonus by a Bonus Device 4 on the Slot Machine 2.

The Slot Machine Display 22 displays the messages, and the messages include, but are not limited to, celebration messages and other messages in forms of, but not limited to, text, graphic images and sounds to prompt and/or initiate a bonus award presentation by the player.

Figure 25:
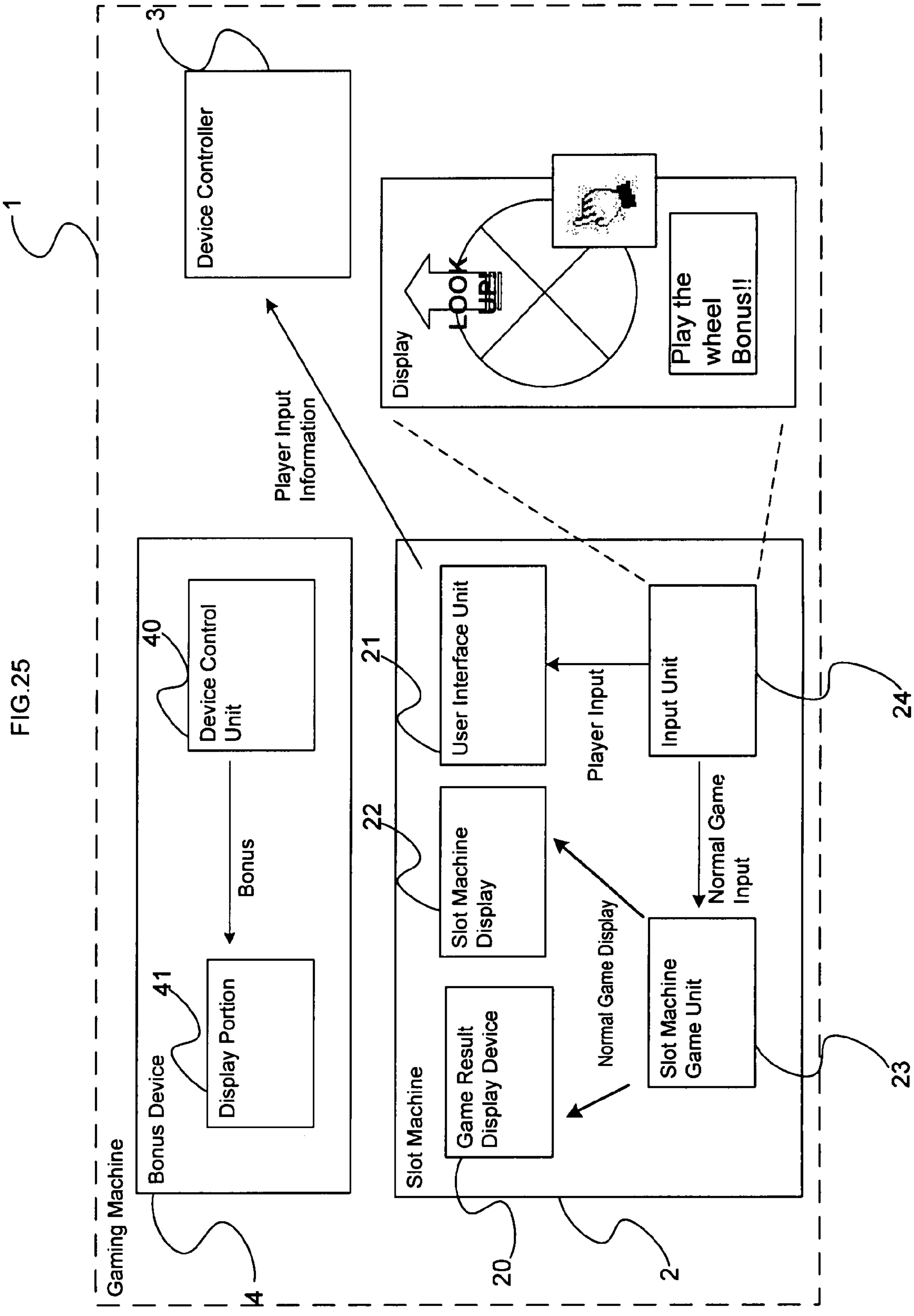
FIG. 25 is a block diagram explaining the gaming machine 1 according to embodiment 16 of the present invention.

FIG. 25 is a block diagram explaining the gaming machine 1 according to embodiment 16 of the present invention. In this embodiment 16, the player presses a button or touches the display of the Input Unit 24 according to the messages shown to the player. Then the User Interface Unit 21 sends messages back to the Device Controller 3 to notify that the player has initiated the bonus award presentation. Upon receiving the messages from the User Interface Unit 21, the Device Controller 3 starts presenting the bonus award with the Bonus Device 4 in the same manner described above.

This mechanism gives players opportunities to interact with the Device Controller 3 for bonus awards. As the User Interface Unit 21 is a plug-able application, it just adds intermediate steps to the bonus presentation and award processes described above, but it does not affect the processes. The Device Controller 3 is not required, but can be used it if it is available. Availability of the User Interface Unit 21 can be exchanged between the User Interface Unit 21 and the Device Controller 3 when communication is established.

The messages or information to be displayed on the Slot Machine 2 when this interaction takes place can be statically installed with the User Interface Unit 21 or dynamically loaded onto the Slot Machine 2 when a bonus hits by using data downloading technologies or audio-video streaming technologies including pre-encoded and/or dynamic (live) encoded audio-video streaming technologies and systems.

Figure 26:
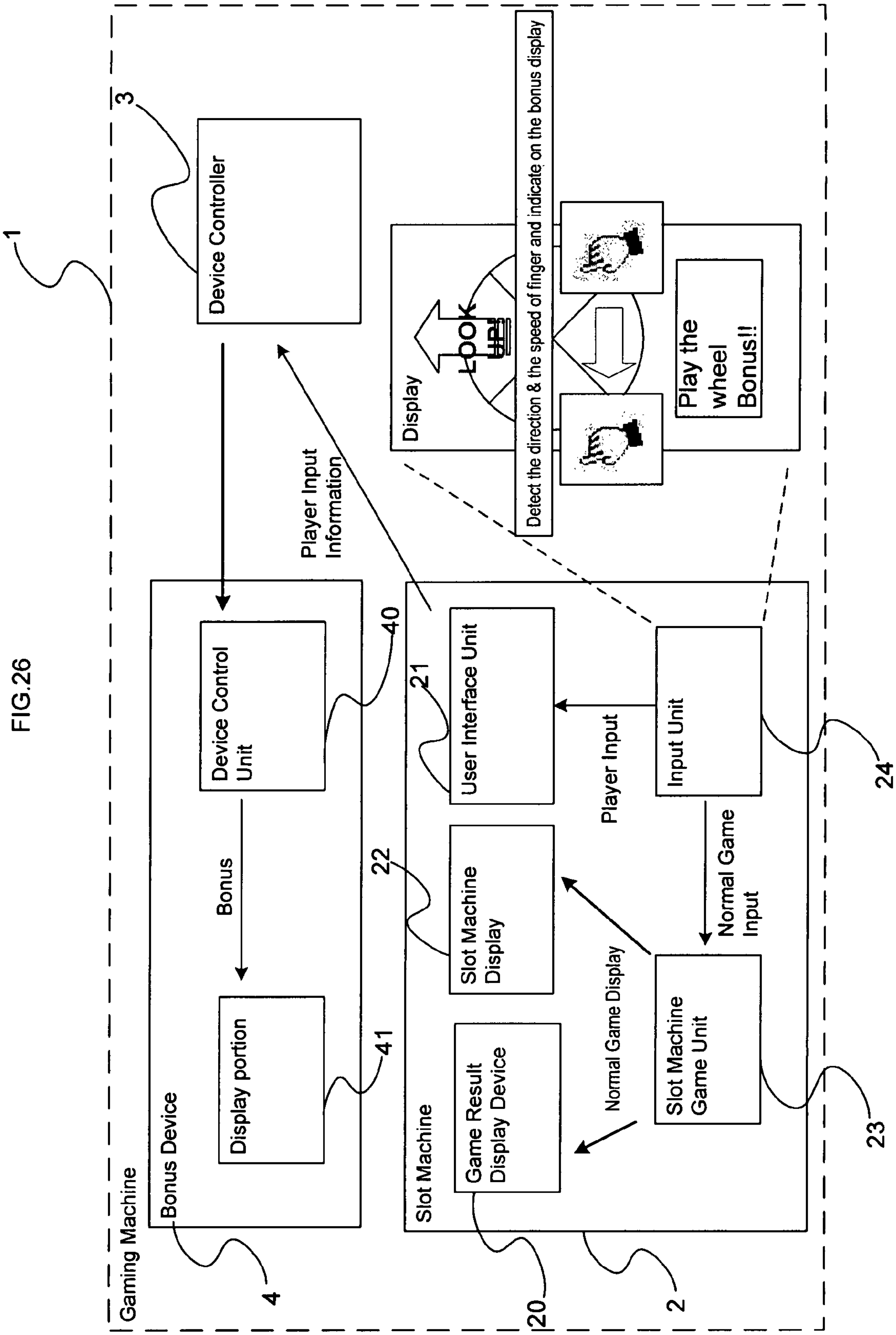
FIG. 26 is a block diagram explaining the gaming machine 1 according to embodiment 17 of the present invention.

FIG. 26 is a block diagram explaining the gaming machine 1 according to embodiment 17 of the present invention. In this embodiment 17, the Input Unit 24 displays a graphical wheel image on the Slot Machine's LCD display. The bonus presentation uses a Bonus Device 4 in a form of wheel device starts if a player presses a button or touches the wheel image on the LCD display of the Input Unit 24.

The bonus presentation can also start when a player slides his/her finger on the LCD display of the Input Unit 24 showing a wheel image from right to left as if he/she rotated the wheel image. By sliding a finger on the wheel image from right to left, the Bonus Device 4 will rotate clockwise. By sliding a finger from left to right, the Bonus Device 4 will rotate counter-clockwise.

The User Interface Unit 21 can detect the motion and the direction of the finger and sends the direction of the motion to the Device Controller 3. The Device Controller 3 can send the direction information to the Bonus Device 4. The Device Control Unit 40 can put the direction information in a rotating wheel device if it is supported.

The User Interface Unit 21 can detect a speed of the motion of finger. The speed information can be put in a wheel rotation speed in the same mechanism described above. Sliding a finger fast can result in a fast rotation if the Bonus Device 4 supports this function.

All of embodiments disclosed herein should be considered as examples in all respects, not as limitations. The scope of the present invention is indicated by the scope of the claims, not by the explanation of embodiments described above, and further, any meanings equivalent to the scope of the claims and all changes within the scope are included.

For example, in the embodiment described above, all of embodiments can have the External Bonus Controller 9 of the embodiment 3. And the External Bonus Controller 9 can determine a bonus award for the Device Controller 3 via the Network 10 for all of the embodiments.

Specifically, the embodiment 20 with divided bonus groups can be determined by the External Bonus Controller 9 of the embodiment 3. As described above, with the larger number of bonus chances, the players can experience a heightened feeling of anticipation and excitement. To achieve this purpose, all of above embodiments can be combined and/or modified together.

What is claimed is:

1. A gaming machine comprising:

a slot machine having a device for displaying a bonus award;

a bonus device provided independently from said slot machine;

a device controller for remotely operating said bonus device and at least checking status whether said slot machine is currently used and wagers accepted by said slot machine during a predetermined time period immediately before the bonus award occurs;

wherein said bonus device describes a bonus display information upon receiving from said device controller in a condition independent from a game result of said slot machine;

wherein said device controller collects a wager from one or more slot machines, checks whether a randomly predetermined value has been reached, determines a bonus content based on the collected wager, remotely operates one or more bonus devices, and transmits same or different bonus display information for each of the bonus devices;

wherein said bonus device includes a device control unit for exchanging information with said device controller and a display portion for displaying the bonus content;

wherein said device controller remotely operates a plurality of bonus devices, and transmits same or different bonus display information to each of said bonus devices;

wherein said plurality of bonus devices are grouped into a plurality of bonus display groups, each of said bonus display groups comprising one or more bonus display devices, and said device controller shows one bonus content using said plurality of said bonus display groups;

wherein said plurality of bonus display groups are divided into an upper level group and a lower level group comprising one or more bonus display groups; and wherein one or more slot machines belonging to said lower level group move to said higher level group when one of said plurality of said machines belonging to said lower level group wins a bonus game.

2. The gaming machine according to claim 1, wherein said device controller includes an external controller which determines the bonus content based on said wager and transmits said bonus content to said device controller, and wherein said device controller transmits the collected wager to said external controller, and transfers a bonus content determination to said external controller.

3. The gaming machine according to claim 2, wherein said device controller uses a casino management system as an external controller, and transfers said bonus content determination to said casino management system.

4. The gaming machine according to claim 1, wherein said display portion comprises one or more liquid crystal display devices.

5. The gaming machine according to claim 1, wherein said display portion comprises one or more movable devices.

6. The gaming machine according to claim 1, wherein said plurality of bonus devices are shared by a plurality of said slot machines, and display bonus content to said slot machines.

7. The gaming machine according to claim 6, wherein said shared plurality of bonus devices display bonus content for any of said plurality of slot machines.

8. The gaming machine according to claim 7, wherein said plurality of slot machines further include individual bonus devices.

9. The gaming machine according to claim 6, wherein said device controller simultaneously displays bonus display content of a plurality of slot machines using said bonus devices shared by said plurality of slot machines.

* * * * *